(12) United States Patent
Takeda et al.

(10) Patent No.: US 10,973,023 B2
(45) Date of Patent: Apr. 6, 2021

(54) TERMINAL AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/776,641

(22) Filed: Jan. 30, 2020

(65) Prior Publication Data

US 2020/0170012 A1     May 28, 2020

Related U.S. Application Data

(63) Continuation of application No. 16/064,144, filed as application No. PCT/JP2016/088260 on Dec. 22, 2016, now abandoned.

(30) Foreign Application Priority Data

Dec. 25, 2015    (JP) .............................. JP2015-255030

(51) Int. Cl.
*H04W 72/04*     (2009.01)
*H04W 8/22*     (2009.01)
(Continued)

(52) U.S. Cl.
CPC ...... *H04W 72/0446* (2013.01); *H04B 7/0413* (2013.01); *H04L 5/0055* (2013.01);
(Continued)

(58) Field of Classification Search
CPC ............... H04W 72/0446; H04W 8/22; H04W 72/1268; H04W 72/0413; H04W 72/048; H04B 7/0413; H04L 5/0055
See application file for complete search history.

(56) References Cited

U.S. PATENT DOCUMENTS

| 8,644,292 B2 | 2/2014 | Gorokhov et al. |
| 2007/0047485 A1 | 3/2007 | Gorokhov et al. |

(Continued)

FOREIGN PATENT DOCUMENTS

| CN | 101292456 A | 10/2008 |
| CN | 101471745 A | 7/2009 |

(Continued)

OTHER PUBLICATIONS

International Search Report issued in PCT/JP2016/088260 dated Feb. 28, 2017 (2 pages).
(Continued)

*Primary Examiner* — Walter J Divito
(74) *Attorney, Agent, or Firm* — Osha Bergman Watanabe & Burton LLP

(57) ABSTRACT

A terminal is disclosed including a receiver that receives a physical downlink shared channel (PDSCH); a transmitter that transmits retransmission control information (Hybrid Automatic Repeat reQuest-Acknowledgement: HARQ-ACK) for the PDSCH based on second processing capability; and a processor that, when a number of resource blocks for the PDSCH exceeds a number, controls to provide the HARQ-ACK based on first processing capability that is different from the second processing capability. In other aspects, radio communication method in a terminal is also disclosed.

3 Claims, 18 Drawing Sheets

(51) Int. Cl.
*H04W 72/12* (2009.01)
*H04B 7/0413* (2017.01)
*H04L 5/00* (2006.01)

(52) U.S. Cl.
CPC ......... *H04W 8/22* (2013.01); *H04W 72/0413* (2013.01); *H04W 72/1268* (2013.01); *H04W 72/048* (2013.01)

(56) References Cited

U.S. PATENT DOCUMENTS

| | | |
|---|---|---|
| 2013/0010720 A1 | 1/2013 | Lohr et al. |
| 2013/0242729 A1 | 9/2013 | Chen et al. |
| 2014/0185530 A1 | 7/2014 | Kuchibhotla et al. |
| 2014/0269452 A1 | 9/2014 | Papasakellariou |
| 2014/0269453 A1* | 9/2014 | Papasakellariou .... H04L 1/1854 370/280 |
| 2016/0183244 A1* | 6/2016 | Papasakellariou .... H04L 5/0057 370/329 |
| 2017/0164363 A1 | 6/2017 | Zhang et al. |
| 2019/0044690 A1 | 2/2019 | Yi et al. |

FOREIGN PATENT DOCUMENTS

| | | |
|---|---|---|
| CN | 102835060 A | 12/2012 |
| CN | 104468030 A | 3/2015 |
| CN | 105009499 A | 10/2015 |
| JP | 2009-506679 A | 2/2009 |
| JP | 2012060539 A | 3/2012 |
| JP | 2015515191 A | 5/2015 |
| WO | 2007025160 A2 | 3/2007 |
| WO | 2007025160 A3 | 5/2007 |

OTHER PUBLICATIONS

Written Opinion of the International Searching Authority issued in PCT/JP2016/088260 dated Feb. 28, 2017 (4 pages).
NTT Docomo, Inc.; "Views on shortened processing time for 1ms TTI", 3GPP TSG RAN WG1 Meeting #86, R1-167366; Gothenburg, Sweden; Aug. 22-26, 2016 (3 pages).
3GPP TS 36300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
Extended European Search Report issued in the counterpart European Patent Application No. 16878843.8, dated Apr. 3, 2019 (11 pages).
Office Action issued in Chinese Application No. 201680075734.3; dated Jan. 20, 2021 (10 pages).
Office Action issued in Japanese Application No. 2017-558235; dated Jan. 26, 2021 (6 pages).

* cited by examiner

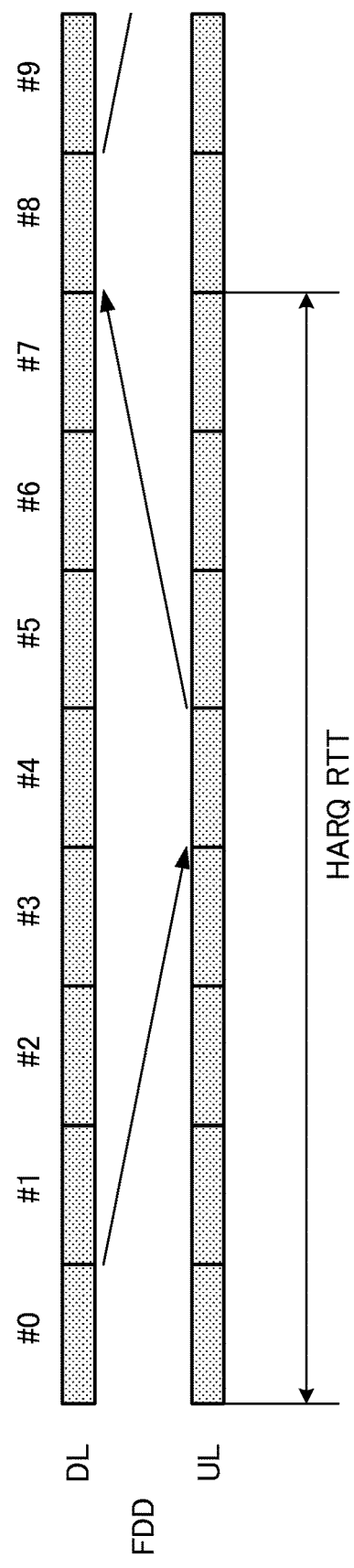
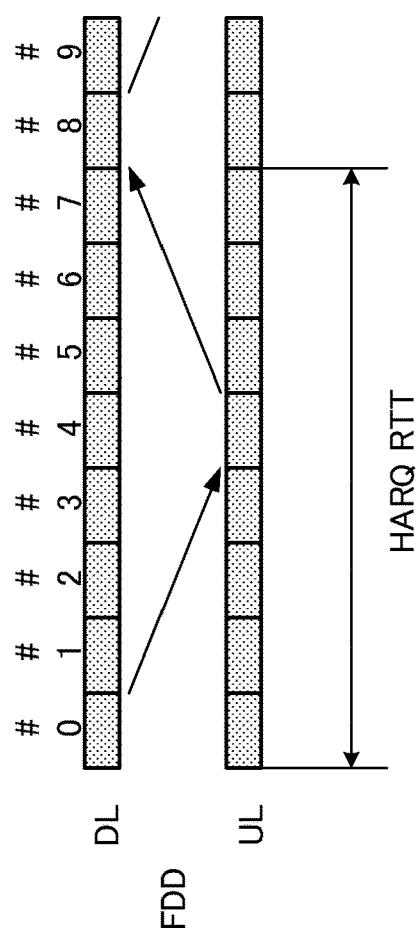
FIG. 4A
FIG. 4B

TBS or no. of PRBs of DL data

TBS or no. of PRBs of UL data

TERMINAL AND RADIO COMMUNICATION METHOD

CROSS-REFERENCE TO RELATED APPLICATIONS

The present application is a continuation application and, thereby, claims benefit under 35 U.S.C. § 120 to U.S. patent application Ser. No. 16/064,144 filed on Jun. 20, 2018, titled, "USER TERMINAL, RADIO BASE STATION AND RADIO COMMUNICATION METHOD," which is a national stage application of PCT Application No. PCT/JP2016/088260, filed on Dec. 22, 2016, which claims priority to Japanese Patent Application No. 2015-255030 filed on Dec. 25, 2015. The contents of the priority applications are incorporated by reference in their entirety.

TECHNICAL FIELD

The present invention relates to a user terminal, a radio base station and a radio communication method in next-generation mobile communication systems.

RELATED ART

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as "LTE-advanced," "LTE Rel. 10," "Rel. 11" or "Rel. 12,", etc.) have been drafted for further broadbandization and increased speed beyond LTE (also referred to as "LTE Rel. 8" or "Rel. 9"), and successor systems of LTE (also referred to as, for example, "FRA" (Future Radio Access), "5G" (5th generation mobile communication system), "LTE Rel. 13," "Rel. 14," and so on) are under study.

Carrier aggregation (CA) to integrate multiple component carriers (CC) is introduced in LTE Rel. 10/11 in order to achieve broadbandization. Each CC is configured with the system bandwidth of LTE Rel. 8 as one unit. In addition, in CA, multiple CCs under the same radio base station (eNB: eNodeB) are configured in a user terminal (UE: User Equipment).

Meanwhile, in LTE Rel. 12, dual connectivity (DC), in which multiple cell groups (CG) formed by different radio base stations are configured in a user terminal, is also introduced. Each cell group is comprised of at least one cell (CC). Since multiple CCs of different radio base stations are integrated in DC, DC is also referred to as "inter-eNB CA."

Also, in LTE Rel. 8 to 12, frequency division duplex (FDD), in which downlink (DL) transmission and uplink (UL) transmission are made in different frequency bands, and time division duplex (TDD), in which DL transmission and UL transmission are switched over time and made in the same frequency band, are introduced.

In above LTE Rel. 8 to 12, the transmission time intervals (TTIs) that are applied to DL transmission and UL transmission between radio base stations and user terminals are configured to one ms and controlled. TTIs in existing systems (LTE Rel. 8 to 12) are also referred to as "subframes" "subframe durations", etc.

CITATION LIST

Non-Patent Literature

Non-Patent Literature 1: 3GPP TS 36.300 Rel.8 Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Meanwhile, future radio communication systems such as LTE after Rel. 13 and 5G are expected to communicate a relatively small amount of data in high frequency bands such as several tens of GHz, as in IoT (Internet of Things), MTC (Machine Type Communication), M2M (Machine To Machine) or the like is performed. When applying communication methods of existing systems (LTE Rel. 8 to 12) (such as one-ms transmission time intervals (TTIs)) to such a future radio communication system, there is a possibility that sufficient communication services cannot be provided.

Therefore, in future radio communication systems, it may be possible to make communication using TTIs (hereinafter referred to as "shortened TTIs") that are shorter than one-ms TTIs (hereinafter referred to as "normal TTIs"). However, in this case, how to control the communication method to use shortened TTIs is the problem.

The present invention has been made in view of the above points, and it is therefore an object of the present invention to provide a user terminal, a radio base station, and a radio communication method whereby appropriate communication can be carried out even when shortened TTIs are used.

Solution to Problem

One aspect of the user terminal of the present invention provides a user terminal that has a control section that controls communication using a first transmission time interval (TTI) and a second TTI shorter than the first TTI, and a transmission section that transmits information related to processing capability, and, in this user terminal, the control section controls communication using the second TTI according to a timing determined based on the information).

Technical Advantage of the Invention

According to the present invention, even when shortened TTIs are applied, communication can be performed appropriately.

BRIEF DESCRIPTION OF THE DRAWINGS

FIG. 4A is a diagram to illustrate an example of the uplink/downlink transmission/receiving timing where normal TTIs are applied, and FIG. 4B is a diagram to explain the uplink/downlink transmission/receiving timing of the first embodiment where shortened TTIs are applied to FDD;

DESCRIPTION OF EMBODIMENTS

Figure 1:
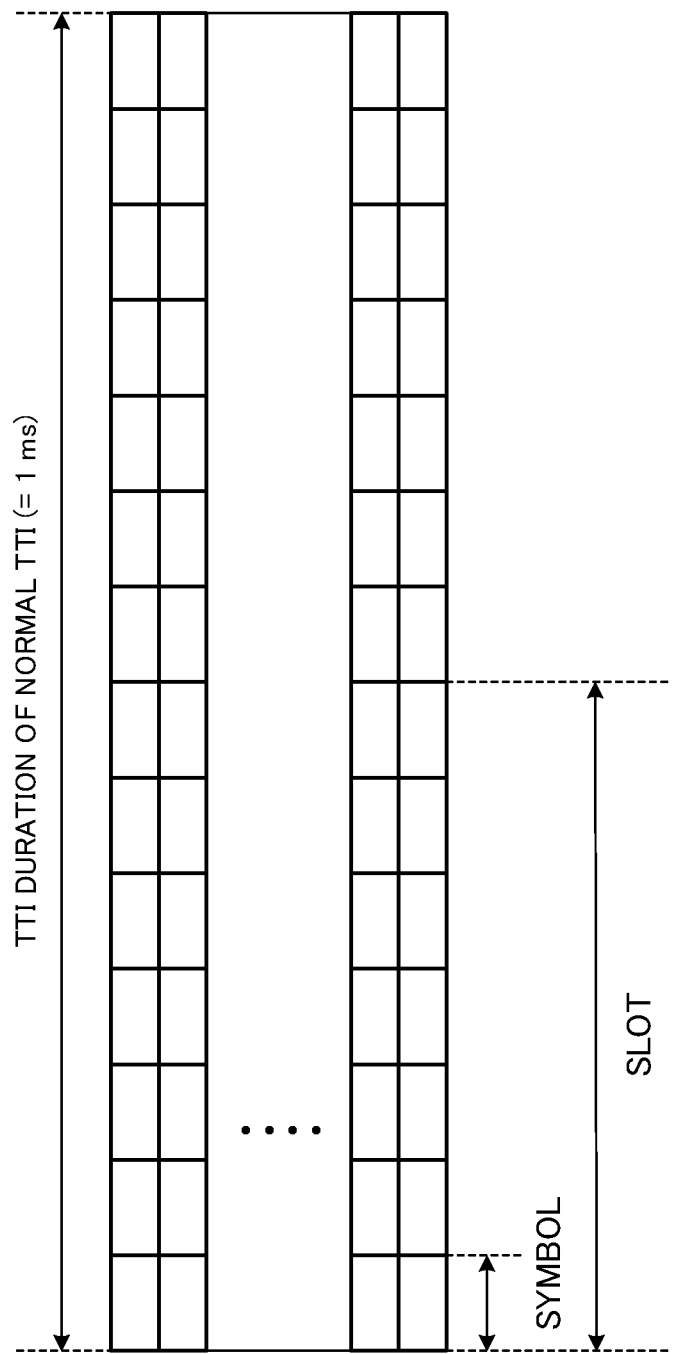
FIG. 1 is a diagram to illustrate an example configuration of a normal TTI.

FIG. 1 is a diagram to illustrate an example of a TTI (normal TTI) in existing systems (LTE Rel. 8 to 12). As illustrated in FIG. 1, a normal TTI has a time duration of one ms. A normal TTI is also referred to as a "subframe," and is comprised of two time slots. In existing systems, a normal TTI is a transmission time unit of one channel-encoded data packet, and is the processing unit of scheduling and link adaptation.

As illustrated in FIG. 1, when a normal cyclic prefix (CP) is used in the downlink (DL), a normal TTI includes 14 OFDM (Orthogonal Frequency Division Multiplexing) symbols (seven OFDM symbols per slot). Each OFDM symbol has a time duration (symbol duration) of 66.7 µs, and a normal CP of 4.76 µs is appended. Since the symbol duration and the subcarrier period are in reciprocal relationship to each other, the subcarrier period is 15 kHz when the symbol duration 66.7 µs.

Also, when normal a cyclic prefix (CP) is used in the uplink (UL), a normal TTI is configured to include 14 SC-FDMA (Single Carrier Frequency Division Multiple Access) symbols (seven SC-FDMA symbols per slot). Each SC-FDMA symbol has a time duration (symbol duration) of 66.7 µs, and a normal CP of 4.76 µs is appended. Since the symbol duration and the subcarrier period are in reciprocal relationship to each other, the subcarrier period is 15 kHz when the symbol duration 66.7 µs.

Incidentally, when an extended CP is used, a normal TTI may include 12 OFDM symbols (or 12 SC-FDMA symbols). In this case, each OFDM symbol (or each SC-FDMA symbol) has a time duration of 66.7 µs, and an extended CP of 16.67 µs is appended. Also, OFDM symbols may be used in the UL. Hereinafter, when OFDM symbols and SC-FDMA symbols are not distinguished, they will be collectively referred to as "symbols."

Meanwhile, in future radio communication systems such as LTE of Rel. 13 and later versions and 5G, a radio interface that is suitable for a high frequency bands such as several tens of GHz, and/or a radio interface that minimizes delay by reducing the packet size are desired, so that communication with a relatively small amount of data such as IoT (Internet of Things), MTC (Machine Type Communication) and M2M (Machine To Machine) can be suitably performed.

When TTIs of a shorter time duration than normal TTIs (hereinafter referred to as "shortened TTIs") are used, the time margin for processing (for example, encoding and decoding) in user terminals and radio base stations increases, so that the processing delay can be reduced. Also, when shortened TTIs are used, it is possible to increase the number of user terminals that can be accommodated per unit time (for example, one ms). For this reason, for future radio communication system, a study is in progress to use shortened TTIs, which are shorter than normal TTIs, as one channel-encoded data packet transmission time unit and/or as the scheduling or link adaptation processing unit.

Figure 2A:
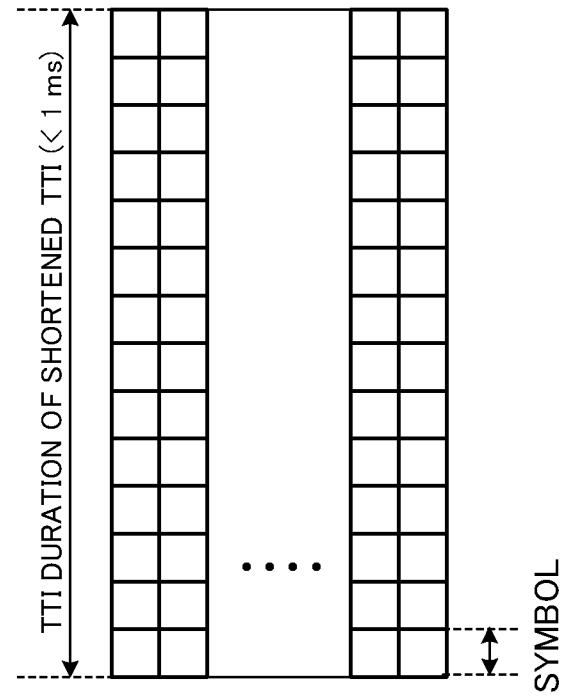
FIG. 2A is a diagram to illustrate a first configuration example of a shortened TTI.
Figure 2B:
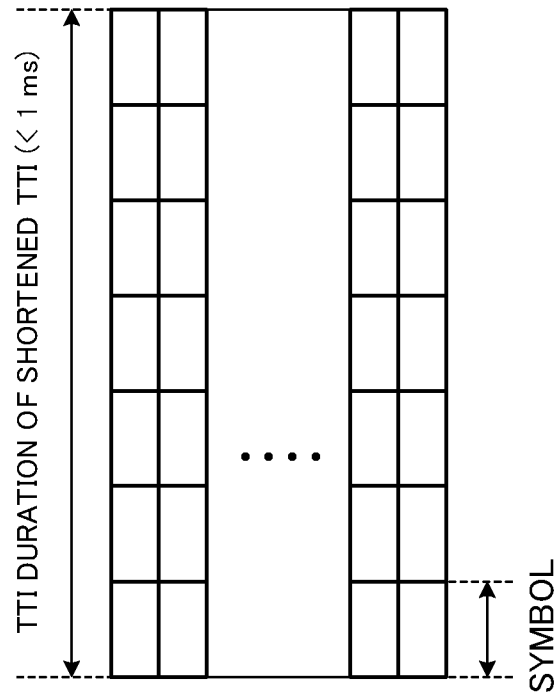
FIG. 2B is a diagram to illustrate a second configuration example of a shortened TTI.

Referring to FIGS. 2A, 2B, 3A, 3B, and 3C, shortened TTI will be explained. FIGS. 2A, and 2B provide diagrams to illustrate example configurations of shortened TTIs. As illustrated in FIG. 2A and FIG. 2B, shortened TTIs have a time duration (TTI duration) shorter than one ms. A shortened TTI may be one TTI duration or multiple TTI durations, whose multiples are one ms, such as 0.5 ms, 0.25 ms, 0.2 ms and 0.1 ms, for example. Alternatively, when a normal CP is used, a normal TTI contains 14 symbols, so that one TTI duration or multiple TTI durations, whose multiples are integral multiples of 1/14 ms, such as 7/14 ms, 4/14 ms, 3/14 ms and 1/14 ms, may be used. Also, when an extended CP is used, a normal TTI contains 12 symbols, so that one TTI duration or multiple TTI durations, whose multiples are integral multiples of 1/12 ms, such as 6/12 ms, 4/12 ms, 3/12 ms and 1/12 ms, may be used. Also in shortened TTIs, as in conventional LTE, whether to use a normal CP or use an extended CP can be configured with higher layer signaling such as broadcast information and RRC signaling. By this means, it is possible to introduce shortened TTIs, while maintaining compatibility (synchronization) with one-ms normal TTIs.

FIG. 2A is a diagram to illustrate a first example configuration of shortened TTIs. As illustrated in FIG. 2A, in the first example configuration, a shortened TTI is comprised of the same number of symbols (here, 14 symbols) as a normal TTI, and each symbol has a symbol duration shorter than the symbol duration of a normal TTI (for example, 66.7 µs).

As illustrated in FIG. 2A, when maintaining the number of symbols in a normal TTI and shortening the symbol duration, the physical layer signal configuration (arrangement of REs, etc.) of normal TTIs can be reused. In addition, when maintaining the number of symbols in a normal TTI, it is possible to include, in a shortened TTI, the same amount of information (the same amount of bits) as in a normal TTI. On the other hand, since the symbol time duration differs from that of normal TTI symbols, it is difficult, as illustrated in FIG. 2A, to frequency-multiplex a signal with shortened TTIs and a signal with normal TTIs in the same system band (or the cell, the CC, etc.).

Also, since the symbol duration and the subcarrier period are each the reciprocal of the other, as illustrated in FIG. 2A, when shortening the symbol duration, the subcarrier period is wider than the 15-kHz subcarrier period of normal TTIs. When the subcarrier period becomes wider, it is possible to effectively suppress the inter-channel interference caused by the Doppler shift when the user terminal moves and the communication quality degradation due to phase noise in the receiver of the user terminal. In particular, in high frequency bands such as several tens of GHz, the deterioration of communication quality can be effectively suppressed by expanding the subcarrier period.

FIG. 2B is a diagram to illustrate a second example configuration of a shortened TTI. As illustrated in FIG. 2B, in the second example configuration, a shortened TTI is comprised of a smaller number of symbols than a normal TTI, and each symbol has the same symbol duration (for example, 66.7 µs) as a normal TTI. For example, referring to FIG. 2B, if a shortened TTI is half the time duration (0.5 ms) of a normal TTI, the shortened TTI is comprised of half the symbols (here, seven symbols) of a normal TTI.

As illustrated in FIG. 2B, when reducing the symbol duration and reducing number of symbols, the amount of information (the amount of bits) included in a shortened TTI can be reduced lower than in a normal TTI. Therefore, the user terminal can perform the receiving process (for example, demodulation, decoding, etc.) of the information included in a shortened TTI in a shorter time than a normal TTI, and therefore the processing delay can be shortened. Also, since the shortened-TTI signal illustrated in FIG. 2B and a normal-TTI signal can be frequency-multiplexed within the same system band (or the cell, the CC, etc.), compatibility with normal TTIs can be maintained.

Although FIG. 2A and FIG. 2B illustrate examples of shortened TTIs assuming that a normal CP is applied (where a normal TTI is comprised of 14 symbols), the configuration of shortened TTIs is not limited to those illustrated in FIGS. 2A and 2B. For example, when an extended CP is used, the shortened TTI of FIG. 2A may be comprised of 12 symbols, and the shortened TTI of FIG. 2B may be comprised of six symbols. A shortened TTI needs only be a shorter time duration than a normal TTI, and the number of symbols in the shortened TTI, the duration of symbols, the duration of the CP and suchlike configurations can be determined freely.

Figure 3A:
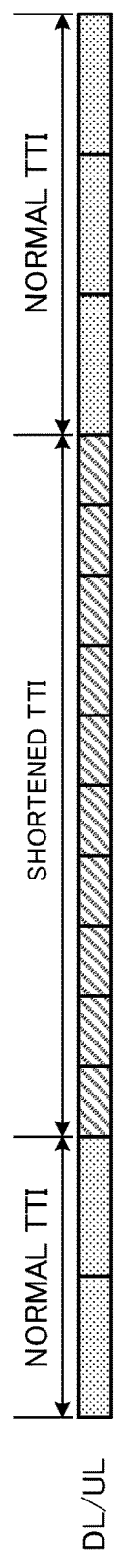
FIG. 3A is a diagram to explain an example in which a normal TTI and a shortened TTI coexist in the same CC.
Figure 3B:
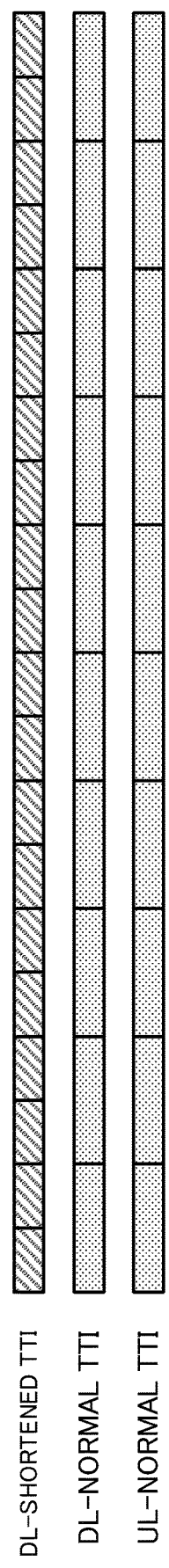
FIG. 3B is a diagram to explain carrier aggregation (CA) or dual connectivity (DC) using a normal TTI and a shortened TTI.
Figure 3C:
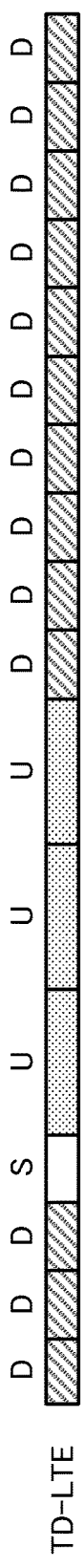
FIG. 3C is a diagram to explain an example in which normal TTIs are configured in UL and shortened TTIs are configured in DL in the TDD system.

Referring to FIGS. 3A, 3B, and 3C, an example of the configuration of a shortened TTI will be described. Future radio communication systems may be configured so that both normal TTIs and shortened TTIs can be configured in order to maintain compatibility with existing systems.

For example, as illustrated in FIG. 3A, normal TTIs and shortened TTIs may coexist in time in the same CC (frequency field). To be more specific, shortened TTIs may be configured in specific subframes (or specific radio frames) of the same CC. For example, in FIG. 3A, shortened TTIs are configured in five consecutive subframes in the same CC, and normal TTIs are configured in the other subframes. Note that the number and locations of subframes where shortened TTIs are configured are not limited to those illustrated in FIG. 3A.

Also, carrier aggregation (CA) or dual connectivity (DC) may be performed by integrating CCs with normal TTIs and CCs with shortened TTIs, as illustrated in FIG. 3B. To be more specific, shortened TTIs may be configured in specific CCs (to be more specific, in the DL and/or the UL of particular CCs). For example, in FIG. 3B, shortened TTIs are configured in the DL of a particular CC and normal TTIs are configured in the DL and UL of another CC. Note that the number and locations of CCs where shortened TTIs are configured are not limited to those illustrated in FIG. 3B.

In the case of CA, shortened TTIs may also be configured in specific CCs (the primary (P) cell and/or secondary (S) cells) of the same radio base station. Meanwhile, in the case of DC, shortened TTIs may be configured in specific CCs (P cell and/or S cells) in the master cell group (MCG) formed by the first radio base station, or shortened TTIs may be configured in specific CCs (primary secondary (PS) cells and/or S cells) in a secondary cell group (SCG) formed by a second radio base station.

As illustrated in FIG. 3C, shortened TTIs may be configured in either the DL or the UL. For example, in FIG. 3C, a case is illustrated in which, in a TDD system, normal TTIs are configured in the UL and shortened TTIs are configured in the DL.

Also, specific DL or UL channels or signals may be assigned to (configured in) shortened TTIs. For example, an uplink control channel (PUCCH: Physical Uplink Control Channel) may be allocated to normal TTIs, and an uplink shared channel (PUSCH: Physical Uplink Shared Channel) may be allocated to shortened TTIs. In this case, for example, the user terminal transmits the PUCCH in normal TTIs and transmits the PUSCH in shortened TTIs.

In FIGS. 3A, 3B, and 3C, the user terminal configures (and/or detects) the shortened TTIs based on implicit or explicit reporting from the radio base station. Below, (1) an example of implicit reporting and examples of explicit reporting using (2) broadcast information or RRC (Radio Resource Control) signaling, (3) MAC (Medium Access Control) signaling, and (4) PHY (Physical) signaling will be explained.

(1) When implicit reporting is used, the user terminal may configure shortened TTIs (including, for example, judging that the communicating cell, channel, signal, etc. use shortened TTIs) based on the frequency band (for example, a band for 5G, an unlicensed band, etc.), the system bandwidth (for example, 100 MHz, etc.), whether or not LBT (Listen Before Talk) is employed in LAA (License Assisted Access), the type of data to be transmitted (for example, control data, voice, etc.), the logical channel, the transport block, the RLC (Radio Link Control) mode, the C-RNTI (Cell-Radio Network Temporary Identifier) and so on. Also, when control information (DCI) addressed to the subject terminal is detected in a PDCCH mapped to the first one, two, three or four symbols in a normal TTI and/or in a one-ms EPDCCH, the user terminal may judge that the one ms where the PDCCH/EPDCCH are included is a normal TTI, and, when control information (DCI) addressed to the subject terminal is detected in a PDCCH/EPDCCH configured otherwise (for example, a PDCCH mapped to symbols other than the first one to four symbols in a normal TTI and/or an EPDCCH that is less than one ms), the user terminal may then judge that a predetermined time period including the PDCCH/EPDCCH is a shortened TTI. Here, the control information (DCI) addressed to the subject terminal can be detected based on the CRC check result of blin-decoded DCI.

(2) When broadcast information or RRC signaling (higher layer signaling) is used, shortened TTIs may be configured based on configuration information that is reported from the radio base station to the user terminal via broadcast information or RRC signaling. The configuration information indicates, for example, which CCs and/or subframes are to be used as shortened TTIs, which channels and/or signals are transmitted/received in shortened TTIs, and so on. The user terminal configures shortened TTIs semi-statically based on configuration information from the radio base station. Note that mode switching between shortened TTIs and normal TTIs may be performed in the RRC reconfiguration step or may be performed in intra-cell handover (HO) in P cells or in the removal/addition steps of CCs (S cells) in S cells.

(3) When MAC signaling (L2 (Layer 2) signaling) is used, shortened TTIs that are configured based on configuration information reported through RRC signaling may be activated or deactivated by MAC signaling. To be more specific, the user terminal activates or de-activates shortened TTIs based on L2 control signals (for example, MAC control elements) from the radio base station. The user terminal may be preconfigured with a timer that indicates the activation period of shortened TTIs, by higher layer signaling such as RRC signaling, and, if, after shortened TTIs are activated by an L2 control signal, there is no UL/DL allocation in the shortened TTIs for a predetermined period, the shortened TTIs may be de-activated if. This shortened TTI deactivation timer may count normal TTIs (one ms) as units, or count shortened TTIs (for example, 0.25 ms) as units. Note that, when the mode is switched between shortened TTIs and normal TTIs in an S cell, the S cell may be de-activated once, or it may be possible to consider that the TA (Timing Advance) timer has expired. By this means, it is possible to provide a non-communicating period when switching the mode.

(4) When PHY signaling (L1 (Layer 1) signaling) is used, shortened TTIs that are configured based on configuration information reported by RRC signaling may be scheduled by PHY signaling. To be more specific, the user terminal detects shortened TTIs based on information included in L1 control signals that are received and detected (for example, a downlink control channel (PDCCH (Physical Downlink Control Channel) or EPDCCH (Enhanced Physical Downlink Control Channel), which hereinafter will be referred to as "PDCCH/EPDCCH").

For example, it is assumed that control information (DCI) for assigning transmission or reception in normal TTIs and shortened TTIs includes different information elements, and, (4-1) when the user terminal detects control information (DCI) including an information element that assigns transmission and reception in shortened TTIs, the user terminal identifies a predetermined time period including the timing where the PDCCH/EPDCCH is detected as a shortened TTI. The user terminal can blind-decode control information (DCI) for assigning transmission or reception in both normal TTIs and shortened TTIs in the PDCCH/EPDCCH. Alternatively, (4-2) when the user terminal detects control information (DCI) including an information element that assigns transmission/reception in shortened TTIs, the user terminal may identify a predetermined time period, in which the timing the PDSCH or the PUSCH scheduled by the PDCCH/EPDCCH (downlink control information (DCI) communicated in the PDCCH/EPDCCH) is transmitted/received is included, as a shortened TTI. Alternatively, (4-3) when the user terminal detects control information (DCI) including an information element that assigns transmission/reception in shortened TTIs, the user terminal may identify a predetermined a predetermined time period, in which the timing to transmit or receive retransmission control information (also referred to as "HARQ-ACKs" (Hybrid Automatic Request-Acknowledgements), "ACKs/NACKs," "A/Ns,", etc.) for the PDSCH or the PUSCH scheduled by the PDCCH/EPDCCH (DCI communicated in the PDCCH/EPDCCH) is included, as a shortened TTI.

Further, the user terminal may detect shortened TTIs based on the state of the user terminal (for example, the idle state or the connected state). For example, if the user terminal is in the idle state, the user terminal may identify all the TTIs as normal TTIs and blind-decode only the PDCCHs included in the first to fourth symbols of the normal TTIs of one ms. Also, if the user terminal is in the connected state, the user terminal may configure (and/or detect) shortened TTIs based on the reporting of at least one of (1) to (4) described above as examples.

As mentioned above, the main purpose of applying (introducing) shortened TTIs is to increase the temporal margin for processing (for example, encoding, decoding, etc.) in user terminals and radio base stations, and realize reduction of processing latency (latency reduction)). For example, latency in the radio lower layer occurs by transmitting data, decoding that data, and feeding back ACK). However, even if the above shortened TTIs are applied on an as-is basis, sufficient processing latency reduction cannot be achieved in some cases.

So-called processing latency reduction focuses on the following points:

(1) Shorten the time it takes to send HARQ-ACK in response to DL data (HARQ RTT (Round Trip Time)).

Such reduction of processing latency is realized by the user terminal quickly decoding DL data and quickly generating HARQ-ACK). Note that RTT refers to the time it takes for a response to be returned after transmitting a signal or data to a communicating party.

(2) Shorten the time from the scheduling of UL data to the transmission of the UL data.

Such reduction of processing latency is realized by the user terminal decoding UL grant quickly and encoding UL data quickly.

(3) Shorten the time from transmission of UL data to HARQ-ACK feedback.

Such reduction of processing latency is realized by the network (for example, radio base station) quickly decoding UL data and quickly generating HARQ-ACK.

When normal TTIs are applied in the case of FDD for the above three points, it is stipulated that transmission or reception operation is performed four ms later (=four TTIs). Further, in the case of TDD, it is specified that transmission or reception operation is performed (4+k) ms later (=(4+k) TTIs). Note that the value of k depends on the TDD UL-DL configuration and the subframe index.

The inventors of the present invention have come up with the idea of applying shortened TTIs to the above three points.

First Embodiment

First, the first embodiment will be described. In the first embodiment, shortened TTIs are applied, and communication is controlled along normal TTIs. To be more specific, the first embodiment relates to communication control when FDD is used, and this control is executed as follows.

(1-1) HARQ-ACK in response to DL data is controlled to be transmitted four TTIs later.

(1-2) UL data in response to UL grant is controlled to be transmitted four TTIs later.

(1-3) HARQ-ACK in response to UL data is controlled to be received four TTIs later.

Also, when TDD is used, the following communication control is executed.

(2-1) HARQ-ACK in response to DL data is controlled to be transmitted (4+k) TTIs later.

(2-2) UL data in response to UL grant is controlled to be transmitted (4+l) TTIs later.

(2-3) HARQ-ACK in response to UL data is controlled to be received (4+m) TTIs later.

Note that "k," "l" and "m" are determined by the UL-DL configuration and the subframe index.

FIG. 4A illustrates an example of communication control where normal TTIs are applied when FDD is used. When DL data and UL grant are transmitted in TTI #0 (subframe #0), the user terminal is controlled so that HARQ-ACK in response to the DL data or UL data in response to the UL grant is transmitted in TTI #4 (subframe #4) four TTIs later. Further, the radio base station (network side) is controlled so that HARQ-ACK in response to the UL data transmitted in TTI #4 is transmitted in TTI #8 four TTIs later.

On the other hand, when shortened TTIs are applied, as illustrated in FIG. 4B, when DL data and UL grant are transmitted in TTI #0, the user terminal is controlled so that HARQ-ACK in response to the DL data or UL data in response to the UL grant is transmitted in TTI #4 four TTIs later. Further, the radio base station (network side) is controlled so that HARQ-ACK in response to the UL data transmitted in TTI #4 is transmitted in TTI #8 four TTIs later.

According to the first embodiment described above, the processing latency can be reduced in proportion to the amount by which the shortened TTI duration is reduced with respect to the normal TTI duration. As an example, in FIGS. 4A and 4B, since the shortened TTI duration is half of the normal TTI duration, the HARQ RTT becomes half. In addition, in the first embodiment, existing LTE FDD/TDD mechanism can be used, so that the circuit implementation in the user terminal can be simplified.

Second Embodiment

Next, a second embodiment will be described. In the second embodiment, communication is controlled under a condition different from that in the first embodiment, and there are roughly two controls as explained below.

Embodiment 2.1

Embodiment 2.1 relates to communication control executed when FDD is used, and this control is executed as follows.

(3-1) HARQ-ACK in response to DL data is transmitted x ms later (where x<4) (or in the first UL-TTI after x ms).

(3-2) UL data in response to UL grant is transmitted x ms later (where x<4) (or in the first UL-TTI after x ms).

(3-3) HARQ-ACK in response to UL data is received x ms later (where x<4) (or in the first DL-TTI after x ms).

Embodiment 2.2

When FDD is used in embodiment 2.2, the following communication control is executed.

(4-1) HARQ-ACK for DL data is transmitted a x TTIs later.

(4-2) UL data in response to UL grant is transmitted a x TTIs later.

(4-3) HARQ-ACK in response to UL data is received a x TTIs later.

In the above (4-1)-(4-3), the value of "x" or "a" may be configured by way of higher layer signaling or the like. Also, the configurable value of "x" or "a" supported by the user terminal may be reported to the network (for example, radio base station) as UE capability information in advance.

According to the second embodiment, the processing latency can be reduced. Furthermore, it is possible to allow implementation of multiple user terminals capable of different processing latency reductions in the network (system)). That is, even if the processing latency to be reduced differs among a plurality of user terminals due to differences in manufacturing cost or the like, communication with these user terminals can be realized. A highly scalable network (system) can be realized.

In the user terminal, the time required for each processing step (or processing) differs depending on the contents of the transmission/receiving process. Here, the time taken for the transmission/receiving process in the user terminal will be described.

Figures 5A, 5B:
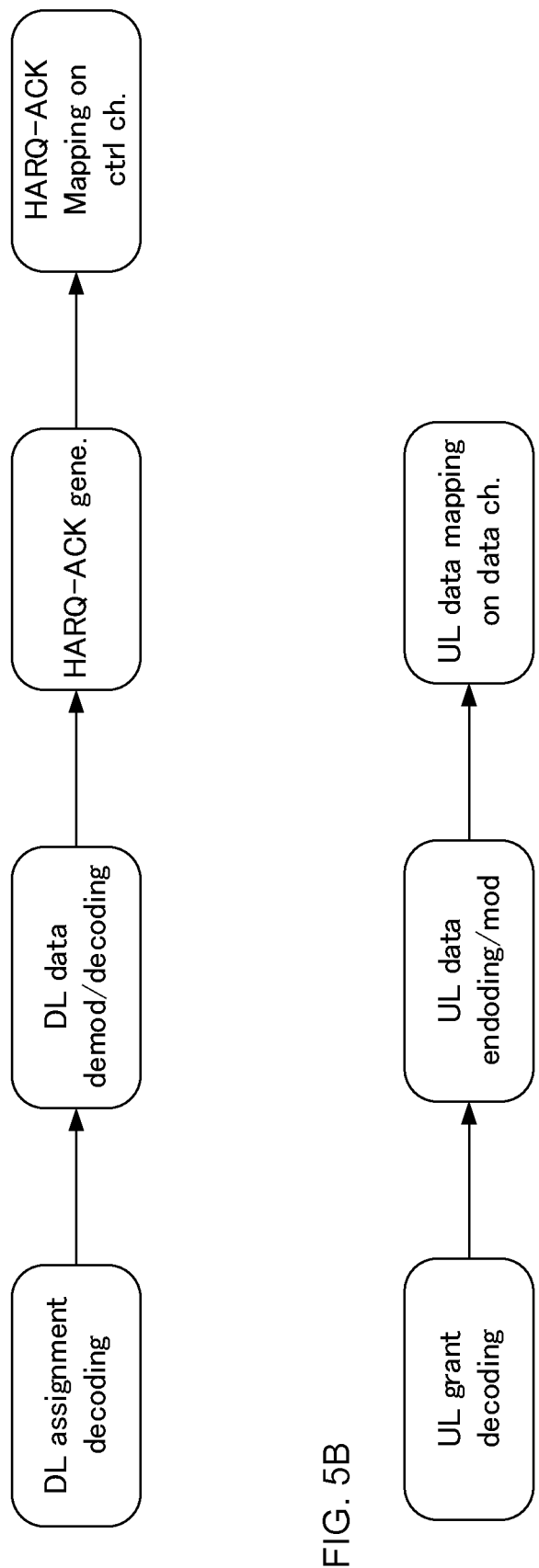
FIG. 5A is a diagram to explain the processing procedure in the case where HARQ-ACK feedback in response to DL data is transmitted via the PUCCH in the user terminal.
FIG. 5B is a diagram to explain the process from scheduling of UL data to the transmission of the UL data.

FIG. 5A is a diagram to explain the processing procedure when HARQ-ACK feedback in response to DL data is transmitted via the PUCCH. As illustrated in the figure, when DL data is received, downlink control information (DL assignment) is decoded, and DL data is demodulated and decoded based on the decoded downlink control information. After this, HARQ-ACK is generated based on whether or not the DL data has been successfully decoded. The generated HARQ-ACK is mapped to an uplink control channel and transmitted to the network.

FIG. 5B is a diagram to explain the processing procedure from the scheduling of UL data to the transmission of the UL data. However, in this processing procedure, transmission of UL data is not accompanied by transmission of uplink control information (UCI). A UL grant transmitted from the network is decoded, and UL data is encoded and modulated based on the UL grant. Thereafter, the UL data is mapped to an uplink data channel and transmitted to the network.

Figure 6:
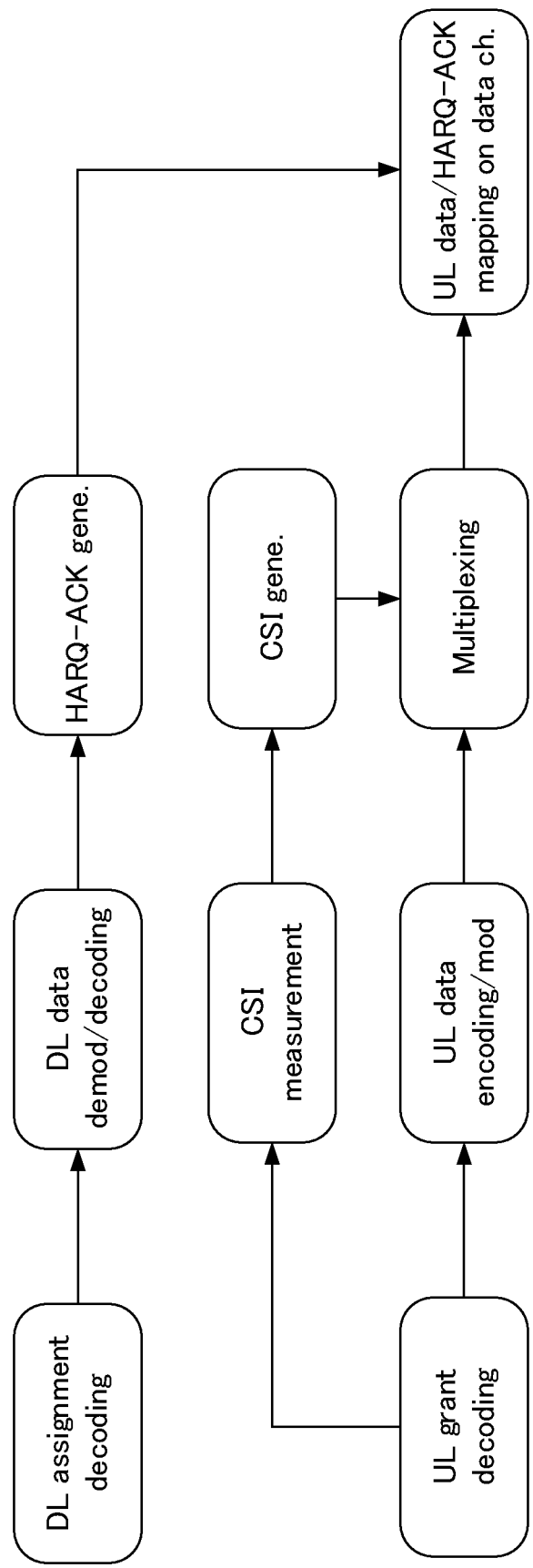
FIG. 6 is a diagram to explain processing in the user terminal.

FIG. 6 is a diagram to explain the processing procedure from the scheduling of UL data to the transmission of the UL data. In this processing procedure, at least one of HARQ-ACK and channel state information (CSI) accompanies transmission of UL data.

Similar to the processing procedure of FIG. 5A, downlink control information (DL assignment) is decoded and DL data is demodulated and decoded based on the decoded downlink control information. After this, HARQ-ACK is generated based on whether or not the DL data has been successfully decoded.

On the other hand, as in FIG. 5B, the UL grant is decoded and the UL data is coded and modulated based on this UL grant. Also, channel state information is measured (CSI measurement) based on the UL grant, and CSI is generated based on the measurement result. The generated CSI is multiplexed in the encoded and modulated UL data. UL data and HARQ-ACK are mapped to an uplink data channel and transmitted to the network.

Note that the processes from UL data transmission to HARQ-ACK feedback (above (3)), which is noted processing latency reduction, includes demodulation and decoding of UL data, generation of HARQ-ACK in response to UL data, generation of HARQ-ACK in response to UL data, mapping of HARQ-ACK, and the like. However, these processes are performed on the network side (for example, radio base station), and are not directly related to the process in the user terminal.

The inventors of the present invention have focused on the fact that the processes from the transmission of UL data to HARQ-ACK feedback (above (3)) depends on the processing capability of the radio base station and does not depend on the processing capability of the user terminal, and have come up with the idea of configuring the timing to transmit HARQ-ACK feedback in response to UL data by higher layer signaling and applying asynchronous HARQ without using the PHICH.

Third Embodiment

Embodiment 3.1

First, embodiment 3.1 will be explained. In embodiment 3.1, the timing at which HARQ-ACK feedback in response to UL data is sent is configured by higher layer signaling (see FIG. 7A)). Examples of timing to be configured are one TTI later, two TTIs later, four TTIs later and eight TTIs later.

The user terminal attempts to receive the PHICH at the configured timing. Then, if a NACK is received in the PHICH, the user terminal performs non-adaptive retransmission according to the PHICH. Also, if a UL grant is detected at the configured timing, the user terminal may perform adaptive retransmission according to the UL grant. In this case, different resources and different modulation can be specified in the UL grant. Making the HARQ-ACK feedback timing in response to UL data configurable as above is equivalent to making the number of HARQ processes to be executed in parallel configurable. However, since synchronous HARQ is used as in existing LTE, the indices of HARQ processes (HARQ process numbers) to be executed in parallel are uniquely determined by the UL data transmission/receiving timing and the HARQ-ACK feedback timing. Note that, if a NACK is returned simply, the user terminal may perform adaptive retransmission or non-adaptive retransmission.

As described above, according to embodiment 3.1, since it is possible to designate multiple transmission timings, communication control can be performed according to the capability of the radio base station. That is, radio base stations with different processing capabilities can be accommodated in the network. For example, a radio base station with a low processing capability can suppress an increase in processing load by configuring relatively large values (for example, values corresponding to three to four ms) in the user terminal. On the other hand, a radio base station with high processing capability can provide low-delay services by configuring relatively small values (for example, values corresponding to 0.5 to 1 ms) in the user terminal.

Note that, although the HARQ-ACK feedback timing in response to UL data in the above description is configured by higher layer signaling, the user terminal may employ HARQ-ACK feedback timing (for example, 4 ms later in the case of FDD) based on existing LTE, especially when there is no configuration by this signaling. By doing this, overhead can be reduced because signaling does not need to be sent to user terminals that do not require particularly low delay. Even when there is configuration by this signaling, HARQ-ACK feedback timing based on existing LTE (for example, four ms later in the case of FDD) can be applied under predetermined conditions (for example, UL data is scheduled by a UL grant transmitted and received in the common search space of the PDCCH). By doing this, even during the process of changing the configuration of the HARQ-ACK feedback timing, scheduling can be continued by applying HARQ-ACK feedback timing based on existing LTE (for example, four ms later in case of FDD). Even if there is configuration by this signaling, if at least one HARQ process (UL data transmission) to which the HARQ-ACK feedback timing based on existing LTE (for example, four ms later in the case of FDD) is applied is included (the HARQ process is stored in the HARQ buffer and processing is in progress), the user terminal may apply the HARQ-ACK feedback timing based on existing LTE (for example, four ms later in the case of FDD) to all the HARQ processes (UL data transmission). This can prevent timing mismatch between HARQ processes and the resulting reduction the efficiency of the use of in radio resources.

Embodiment 3.2

In embodiment 3.2, the PHICH is not used, and asynchronous HARQ is used. This eliminates the need to configure the feedback timing. User terminal does not attempt to receive the PHICH—that is, the user terminal operates in the same manner as when an ACK is received in the PHICH. The user terminal performs asynchronous retransmission based on the HPN indicator included in a UL grant.

In addition, when the user terminal performs asynchronous retransmission based on the HPN indicator included in a UL grant, an RV indicator to specify the redundancy version (RV) may be further included in the UL grant. The user terminal selects the HARQ process to transmit based on the HPN indicator included in the UL grant, and, furthermore, the user terminal determines which RV of the HARQ process is transmitted, based on the RV indicator.

Also, even if asynchronous retransmission is performed based on the HPN indicator included in a UL grant, the UL grant transmitted and received in the common search space of the PDCCH does not need to include control information bits necessary for applying asynchronous HARQ, such as HPN indicators and RV indicators. In this case, the user terminal can perform blind decoding of the UL grants based on the assumption that there are no HPN indicators or RV indicators in the common search space of the PDCCH. Also, when a UL grant is detected in the common search space of the PDCCH, the user terminal can transmit new data or retransmission UL data at the timing based on existing LTE (for example, four ms later in case of FDD).

According to the third embodiment described above, <Embodiment 3.1> is equivalent to performing retransmission at the timing specified by higher layer, and <Embodiment 3.2> is equivalent to making retransmission at the timing specified by the physical layer.

Figure 8A:
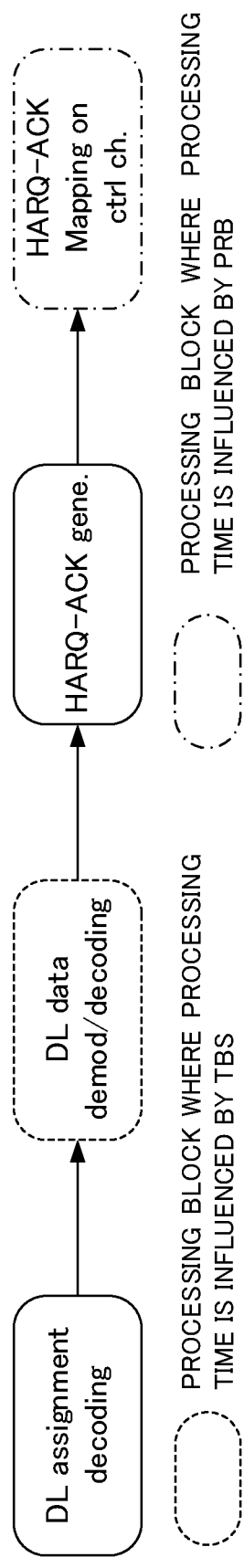
FIG. 8A is a diagram to explain the process influenced by TBS and PRB after decoding of downlink control signals in the user terminal.
Figure 8B:
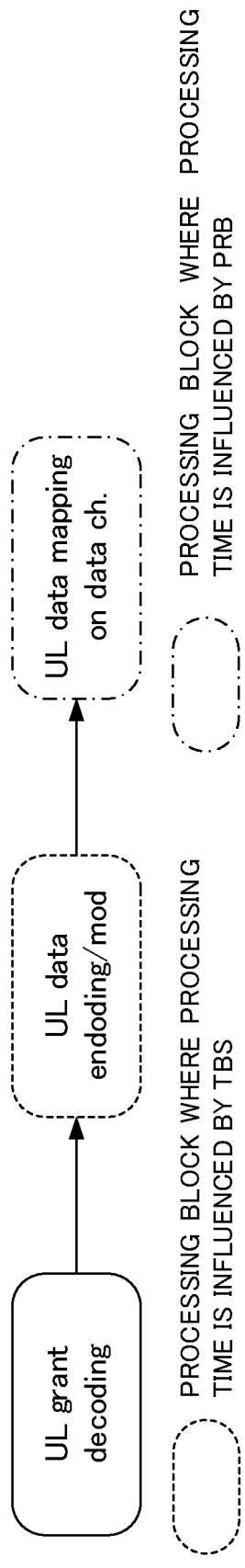
FIG. 8B is a diagram to explain the process influenced by TBS and PRB after decoding of UL grants in the user terminal.
Figure 9:
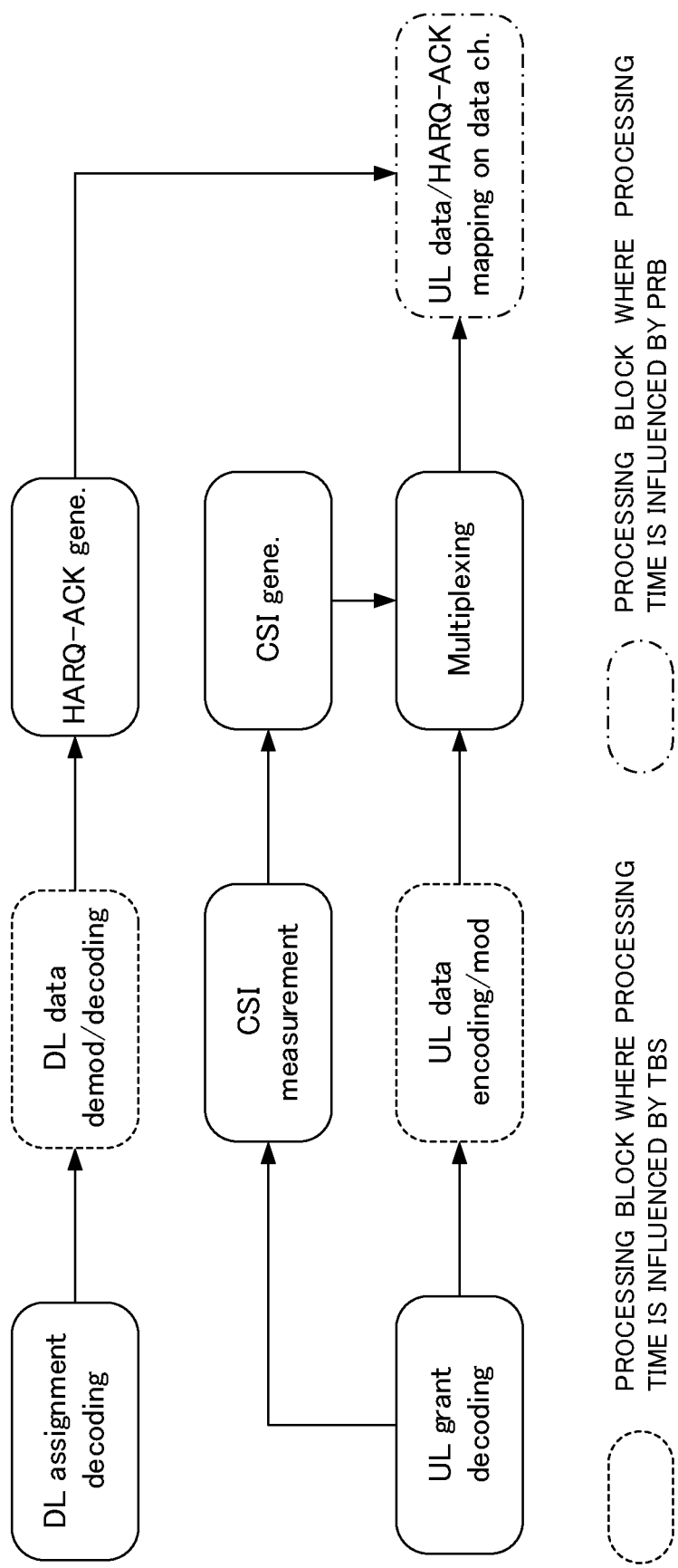
FIG. 9 is a diagram to explain processing in the user terminal.

Here, again, the point that the time required for each processing step (or processing) differs depending on the contents of the transmission/receiving process will be described. In various processes illustrated in FIG. 5A, FIG. 5B and FIG. 6, the processing time may fluctuate depending on the size of data (TBS: Transport Block Size) and the amount of frequency resources (the number of PRBs (Physical Resource Blocks)). For example, the larger the TBS, the longer it may take for the error correction decoding process and the CRC check process (for example, the chain-lined blocks in FIG. 8A, FIG. 8B and FIG. 9). Further, as the number of PRBs increases, there is a possibility that it may take a longer time to perform rate matching and resource mapping considering RSs and so on, and the precoding process according to transmission beam forming (for example, the chain-lined blocks in FIG. 8A, FIG. 8B and FIG. 9)). For example, the final step (mapping) in FIG. 8A, FIG. 8B or FIG. 9 includes the process of performing data mapping, determining transmission power and making transmission.

Focusing on the possibility of processing time fluctuation due to the TBS and the number of PRBs, the present inventors have come up with the idea of specifying more fragmented UE capability signaling.

Fourth Embodiment

Embodiment 4.1

In embodiment 4.1, the UE capability signaling reported when HARQ-ACK feedback in response to DL data is sent in PUCCH transmission is defined. That is, when HARQ-ACK feedback in response to DL data is transmitted via PUCCH transmission, different processing latencies are reported as UE capability information according to the following conditions:
 (1) TBS of DL data;
 (2) the number of allocation PRBs of DL data;
 (3) m-ary modulation value (level) of DL data;
 (4) the number of MIMO (Multi-Input Multi-Output) layers of DL data;
 (5) the number of HARQ-ACK bits of the PUCCH; and
 (6) the number of allocation PRBs of the PUCCH.

Figure 10A:
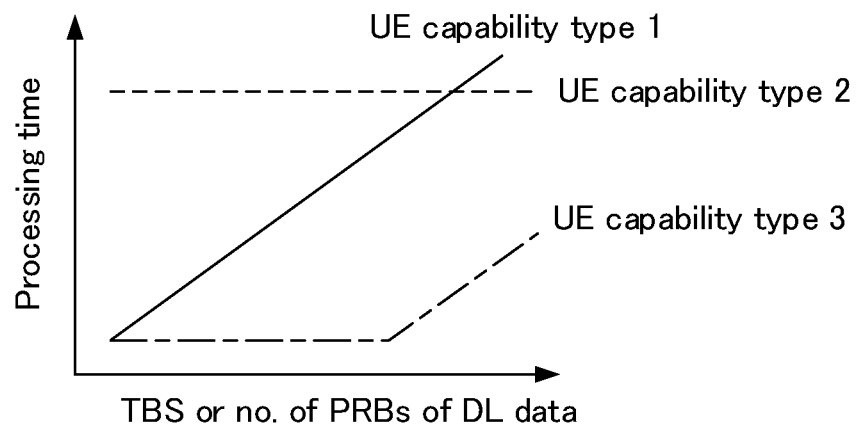
FIG. 10A and FIG. 10B are diagrams to explain the UE capability information which the user terminal reports to the network in the fourth embodiment.
Figure 10B:
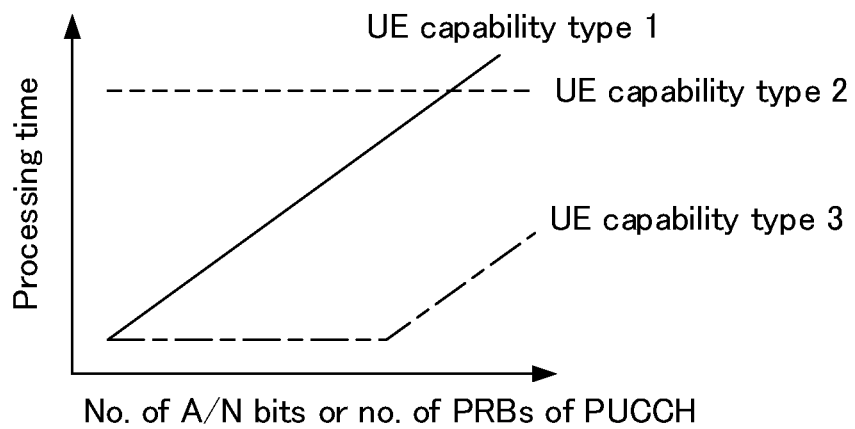

In general, the larger the TBS/the number of PRBs of DL data, the longer it takes for the receiving/decoding process. Also, the larger the number of HARQ-ACK bits/the number of PRBs of the PUCCH, the longer it takes for the transmission/encoding process. Therefore, the user terminal reports the UE capability information as illustrated in FIG. 10A and FIG. 10B to the network). In FIG. 10A and FIG. 10B (and FIGS. 11A and 11B and FIGS. 12A and 12B), successive values are illustrated in graph representations as UE capabilities, but these are merely examples, and UE capabilities may be represented in discrete values as well. In addition, the processing latency may be specified in relationship to one of the above conditions (1) to (6), or may be specified (stipulated) for a combination of two or more conditions.

UE capability type 1 in FIG. 10A indicates that the TBS or the number of PRBs of DL data is proportional to the processing time). UE capability type 2 indicates that the processing time (long processing time) is constant regardless of the TBS or the number of PRBs. UE capability type 3 indicates that a certain processing time (short) can be realized until the TBS or the number of PRBs reaches a predetermined value, and that, when the TBS or the number of PRBs exceeds a predetermined value, the TBS or the number of PRBs is proportional to the processing time. In FIG. 10B, the TBS or the number of PRBs can be replaced by the number of HARQ-ACK bits of the PUCCH or the number of allocation PRBs of the PUCCH, and each type indicates the same characteristics.

The network configures the timing to send HARQ-ACK feedback to the user terminal via PUCCH transmission based on the received UE capability information. At this time, different timing may be configured according to the capability of the target user terminal and the conditions (1) to (6)). Also, if there is a combination of two or more of the conditions (1) to (6), different timing may be configured.

In the state where the PUCCH transmission timing of HARQ-ACK feedback is not configured (state with no configuration) as described above, HARQ-ACK may be transmitted at the same timing as in existing LTE (normal TTI). This means, in other words, existing LTE operation will be performed by default.

According to embodiment 4.1, the network can know the processing time for HARQ-ACK feedback in response to DL data in the user terminal from the TBS and the number of PRBs. Therefore, even when a user terminal with a relatively low processing capability is accommodated, the network is still able to configure HARQ-ACK feedback in a short time.

For example, if user terminal A can send feedback within one ms if the TBS is less than or equal to X and the number of PRBs is less than or equal to Y, and user terminal B can send feedback within one ms regardless of the TBS or the number of PRBs, the network can apply scheduling restrictions to these user terminals so that feedback within one ms is configured in both user terminals, and, in user terminal A, the TBS of DL data is X or less and the number of PRBs is Y or less. In this manner, throughput reduction due to scheduling restrictions is also allowed for a user terminal (user terminal A) having relatively low processing capability, so that it is possible to provide the same low delay service as by a user terminal (user terminal B) with high processing capability.

Embodiment 4.2

In embodiment 4.2, UE capability signaling that is reported when UL data is transmitted in response to UL grants is defined. When UL data is sent in response to a UL grant, different processing latencies are reported as UE capability information according to the following conditions:
 (7) TBS of UL data;
 (8) the number of allocation PRBs of the PUSCH;
 (9) m-ary modulation value of the PUSCH;
 (10) the number of MIMO layers of the PUSCH; and
 (11) whether or not UCI is multiplexed on the PUSCH or its payload.

In general, the larger the TBS/the number of PRBs of the UL data, the longer it takes for the transmission/encoding process. Also, the larger the number of HARQ-ACK bits/the number of PRBs of the PUCCH, the longer it takes for the transmission/encoding process. For this reason, the UE capability information as illustrated in FIG. 11A and FIG. 11B is reported to the network.

Figure 11A:
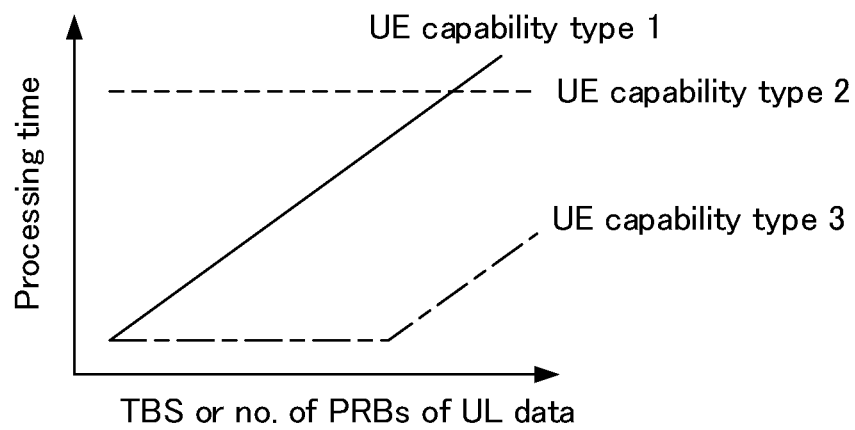
FIG. 11A and FIG. 11B are diagrams to explain the UE capability information which the user terminal reports to the network in the fourth embodiment.
Figure 11B:
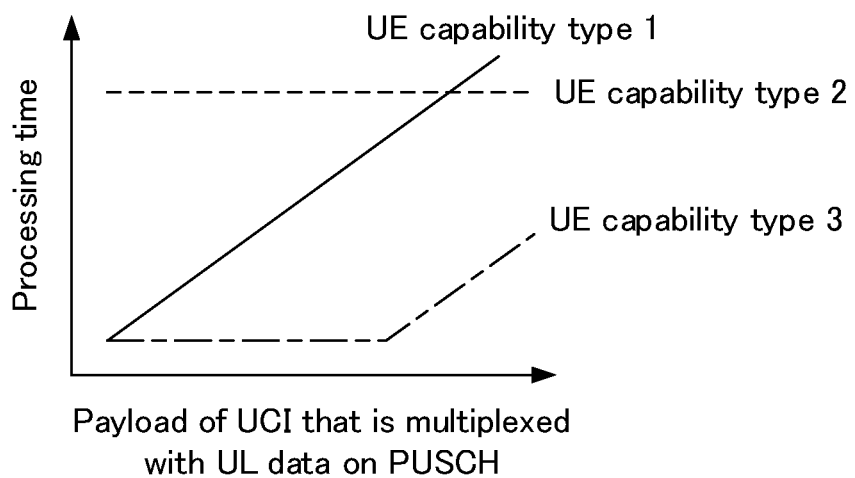

Note that in each type in FIG. 11A, DL data in FIG. 10A is replaced by UL data, and, in each type in FIG. 11B, the number of HARQ-ACK bits of the PUCCH or the number of allocation PRBs of the PUCCH in FIG. 10B is replaced by the above conditions (7) to (11), and therefore their detailed explanation will be omitted. In FIG. 11A and FIG. 11B, successive values are illustrated in graph representations as UE capabilities, but these are merely examples, and UE capabilities may be represented in discrete values as well. In addition, the processing latency may be specified in relationship to one of the above conditions (7) to (11), or may be specified (stipulated) for a combination of two or more conditions.

The network configures the uplink data transmission timing for a user terminal based on the received UE capability information. At this time, different timings may be configured according to the capability of the target user terminal and the conditions (7) to (11). Also, different timing may be configured for a combination of two or more of the conditions (7) to (11).

In addition, UL data may be transmitted at the same timing as in existing LTE in the state where no configuration is provided. In other words, default means performing existing LTE (normal TTI) operation.

In embodiment 4.2, for example, communication control can be performed so that the processing time is one mm or less only when the TBS of uplink data is not less than a first specific value and not more than a second specific value. In addition to this, communication control can be performed to reduce the processing time to one mm or less only when UCI is not multiplexed on the PUSCH, or it is possible to perform communication control to specify the uplink data TBS and the number of PRBs.

According to embodiment 4.2, the network can know the processing time of UL data in the user terminal from the TBS and the number of PRBs. Therefore, even when a user terminal with a relatively low processing capability is accommodated, the network is still able to configure UL data transmission in a short time. For example, if user terminal A can send UL data within one ms if the TBS is less than or equal to X and the number of PRBs is less than or equal to Y, and user terminal B can send UL data within one ms regardless of the TBS or the number of PRBs, the network can apply scheduling restrictions to these user terminals so that UL data within one ms is configured in both user terminals, and, in user terminal A, the TBS of UL data is X or less and the number of PRBs is Y or less. In this manner, throughput reduction due to scheduling restrictions is also allowed for a user terminal (user terminal A) having relatively low processing capability, so that it is possible to provide the same low delay service as by a user terminal (user terminal B) with high processing capability.

Figure 12A:
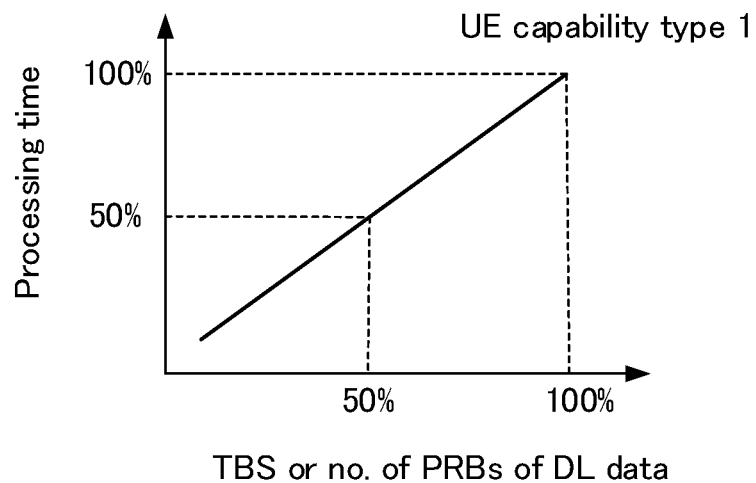
FIG. 12A and FIG. 12B are diagrams to explain the UE capability information which the user terminal reports to the network in the fourth embodiment.
Figure 12B:
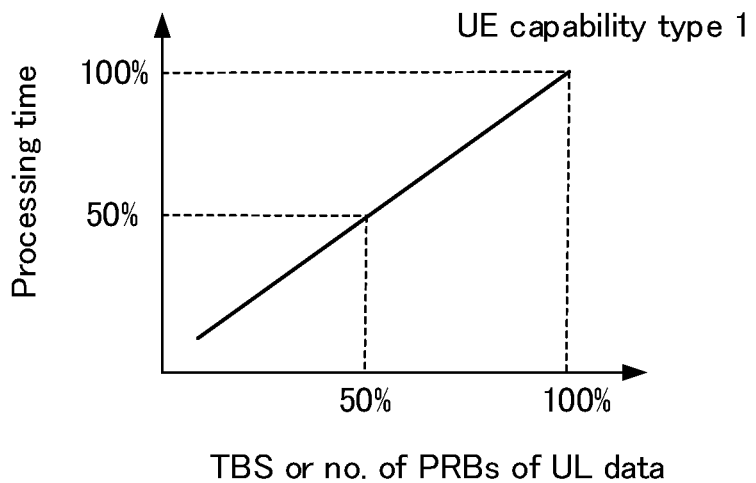

Next, a specific example of communication control will be described with reference to FIGS. 12A and 12B. When the user terminal reports UE capability as illustrated in FIGS. 12A and 12B, the network can configure the UE so that the DL HARQ timing and the UL scheduling timing are reduced to 50%. In this case, the network schedules DL/UL data so that the TBS/PRB of DL/UL do not exceed a predetermined value (50% in FIGS. 12A and 12B). Also, the user terminal applies the configured HARQ/scheduling timing (50% in FIGS. 12A and 12B) unless the TBS/PRB of the DL/UL exceed a predetermined value (50% in FIGS. 12A and 12B)). If TBS/PRB of DL/UL exceeds the predetermined value (50%), control at a later timing may be allowed, instead of the configured HARQ/scheduling timings.

As described above, according to the fourth embodiment, shortened TTIs can be appropriately used according to the processing capability of the user terminal, so that it is possible to achieve reduction of processing latency.

It is also possible to combine above embodiments 4.1 and 4.2. For example, the UE capability information may be a combination of the UE capability information of the embodiment 4.1 (which specifies (stipulates) the processing time corresponding to at least one of the conditions (1) to (6)) and the UE capability information of embodiment 4.2 (which specifies (stipulates) the processing time corresponding to at least one of the conditions (7) to (11)). In this case, the timing of HARQ-ACK feedback in response to DL data is appropriately controlled, and the timing of transmit UL data is appropriately controlled.

According to the first to fourth embodiments described above, communication can be appropriately performed even when shortened TTIs are applied.

(Radio Communication System)

Now, the structure of the radio communication system according to an embodiment of the present invention will be described below. In this radio communication system, the radio communication methods of the above-described embodiment are employed. Note that the radio communication methods of the above-described embodiments may be applied individually or may be applied in combination.

Figure 13:
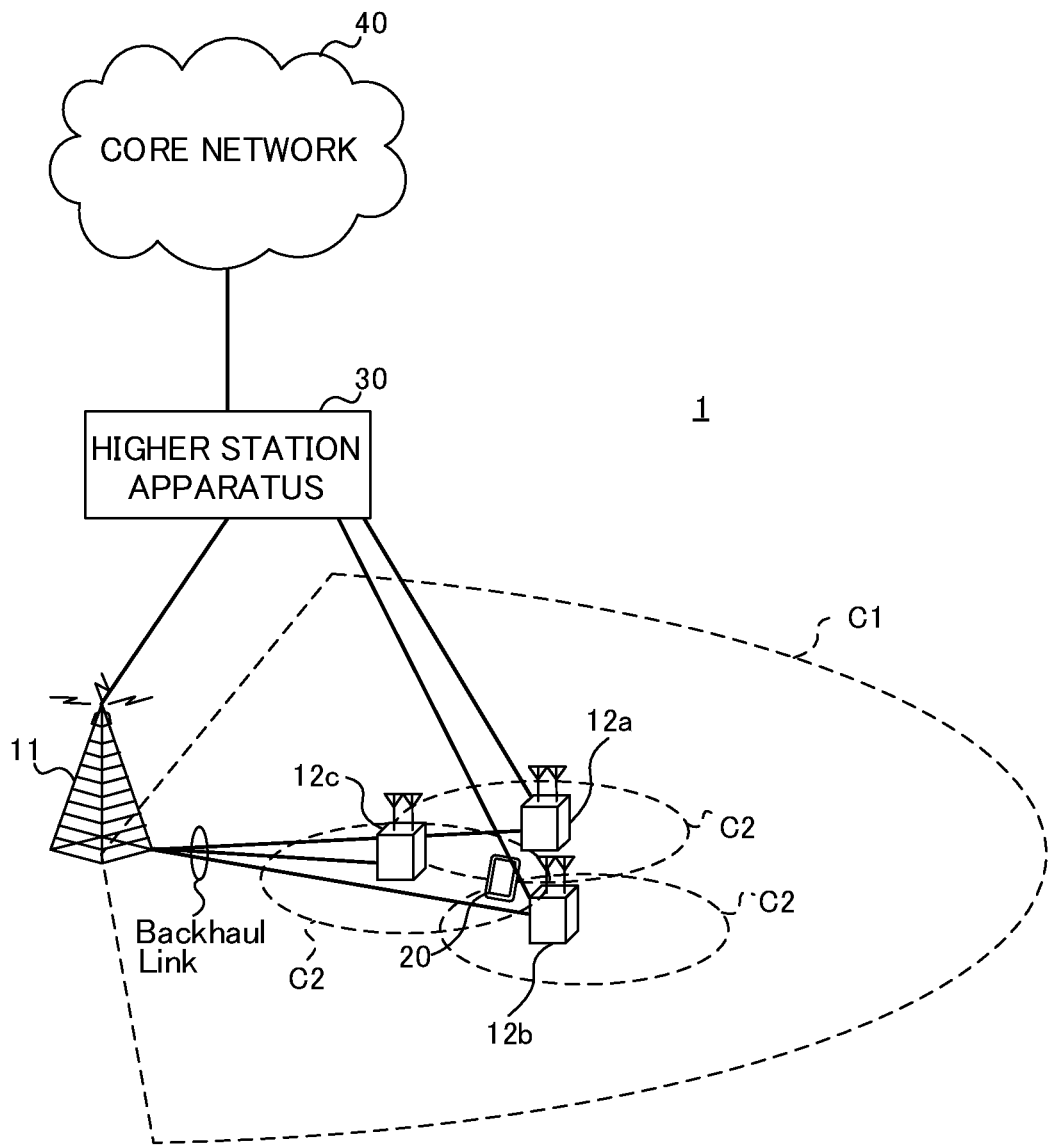
FIG. 13 is a diagram to illustrate an example of a schematic structure of a radio communication system according to the present embodiment.

FIG. 13 is a diagram to illustrate an example of a schematic structure of a radio communication system according to an embodiment of the present invention. The radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-A" (LTE-Advanced), "IMT-Advanced," "4G," "5G," "FRA" (Future Radio Access) and so on.

The radio communication system 1 illustrated in FIG. 13 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the configuration of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to make communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and OFDMA may be used in the uplink.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Uplink control information (UCI: Uplink Control Information), including at least one of delivery acknowledgment information (ACK/NACK) and radio quality information (CQI), is transmitted by the PUSCH or the PUCCH. By means of the PRACH, random access preambles for establishing connections with cells are communicated.

<Radio Base Station>

Figure 14:
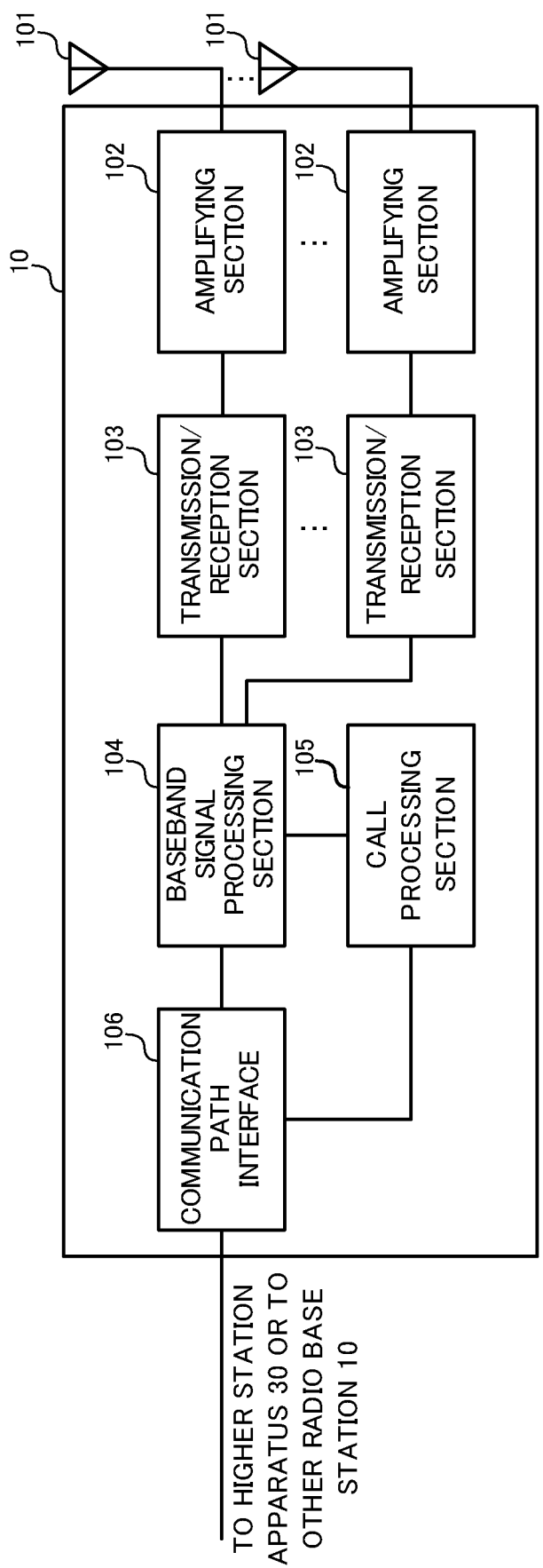
FIG. 14 is a diagram to illustrate an example of an overall structure of a radio base station according to present embodiment.

FIG. 14 is a diagram to illustrate an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are pre-coded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 15:
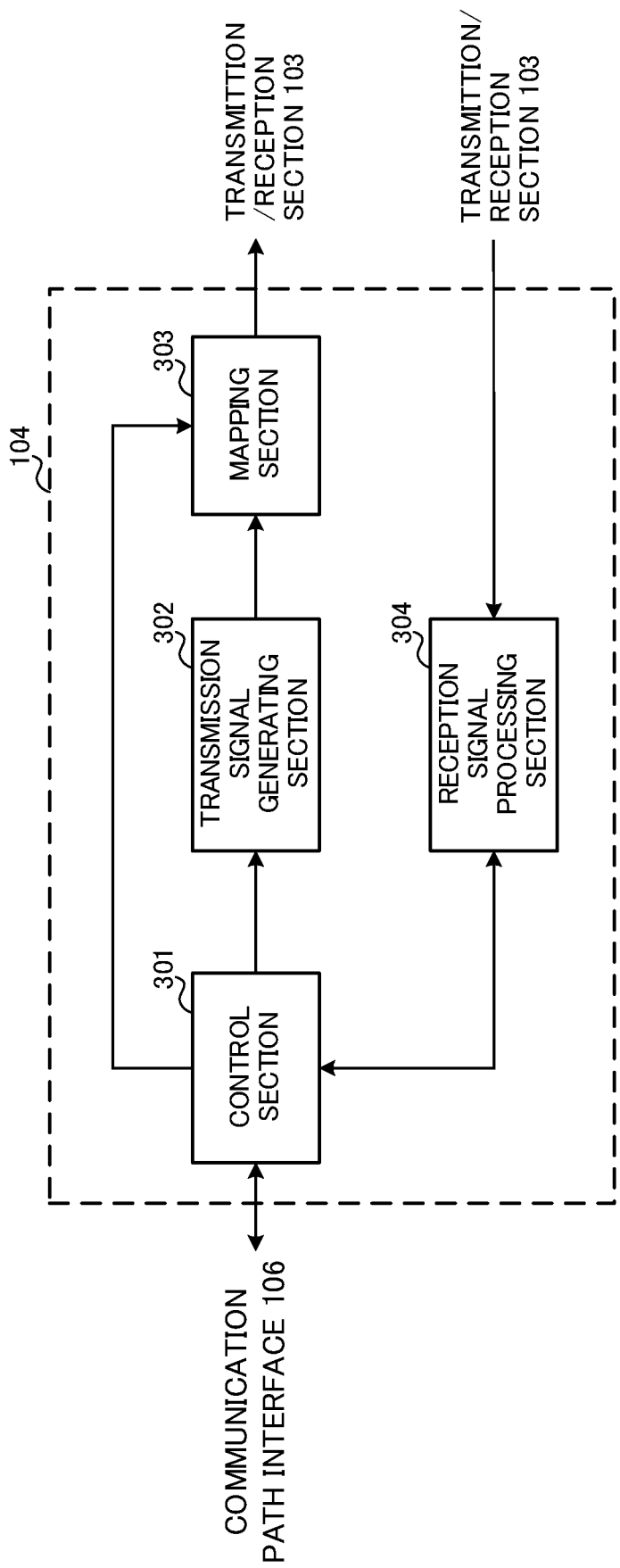
FIG. 15 is a diagram to illustrate an example of a functional structure of a radio base station according to present embodiment.

FIG. 15 is a diagram to illustrate an example of a functional structure of a radio base station according to the present embodiment. Note that, although FIG. 15 primarily illustrates functional blocks that pertain to characteristic parts of the present embodiment, the radio base station 10 has other functional blocks that are necessary for radio communication as well. As illustrated in FIG. 15, the baseband signal processing section 104 has a control section 301, a transmission signal generation section 302, a mapping section 303 and a received signal processing section 304.

The control section 301 controls the entire radio base station 10. The control section 301 controls, for example, the generation of downlink signals by the transmission signal generation section 302, the mapping of signals by the mapping section 303, the signal receiving process by the received signal processing section 304, and the like.

To be more specific, the control section 301 controls the transmission of downlink (DL) signals (including, for example, controlling the modulation scheme, the coding rate, the allocation of resources (scheduling), etc.) based on channel state information (CSI) that is reported from the user terminals 20.

Furthermore, the control section 301 controls the carrier aggregation (CA) of the user terminal 20. To be more specific, the control section 301 may control the transmission signal generation section 302 to determine application of CA/changes in the number of CCs and so on, based on CSI or the like reported from the user terminals 20, and generate information to indicate such application/changes. Note that the information to indicate the application/changes may be included in control information sent by higher layer signaling.

Further, the control section 301 controls the transmission time intervals (TTIs) used for receiving downlink signals and/or transmitting uplink signals. The control section 301 configures one-ms normal TTIs and/or shortened TTIs that are shorter than normal TTIs. Example structures and configurations of shortened TTIs have been explained with reference to FIGS. 2A, 2B, 3A, 3B, and 3C. The control section 301 may command configuration of shortened TTIs to the user terminal 20 by way of (1) implicit reporting, or by way of explicit reporting using at least one of (2) RRC signaling, (3) MAC signaling and (4) PHY signaling.

In the first embodiment, the control section 301 performs control so that HARQ-ACK in response to UL data is transmitted four TTIs later. The control section 301 may perform control so that HARQ-ACK in response to UL data is transmitted (4+m) TTIs later.

In the second embodiment, the control section 301 performs control so that HARQ-ACK in response to UL data is transmitted x ms later (where x<4) (or in the first DL-TTI after x ms)). Alternatively, the control section 301 may perform control so that HARQ-ACK in response to UL data is received a x TTIs later.

Figure 7A:
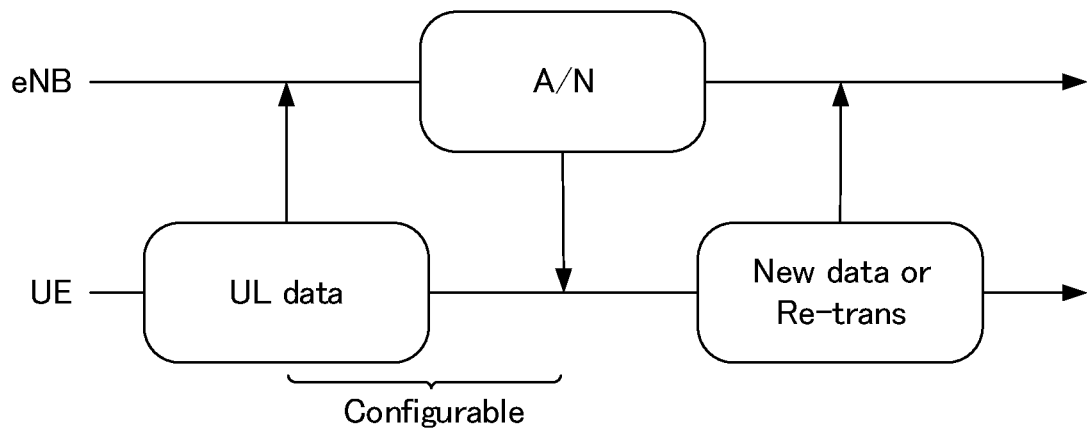
FIG. 7A is a diagram to explain a process in which the HARQ-ACK feedback transmission timing in response to UL data is configured by higher layer signaling in the third embodiment.
Figure 7B:
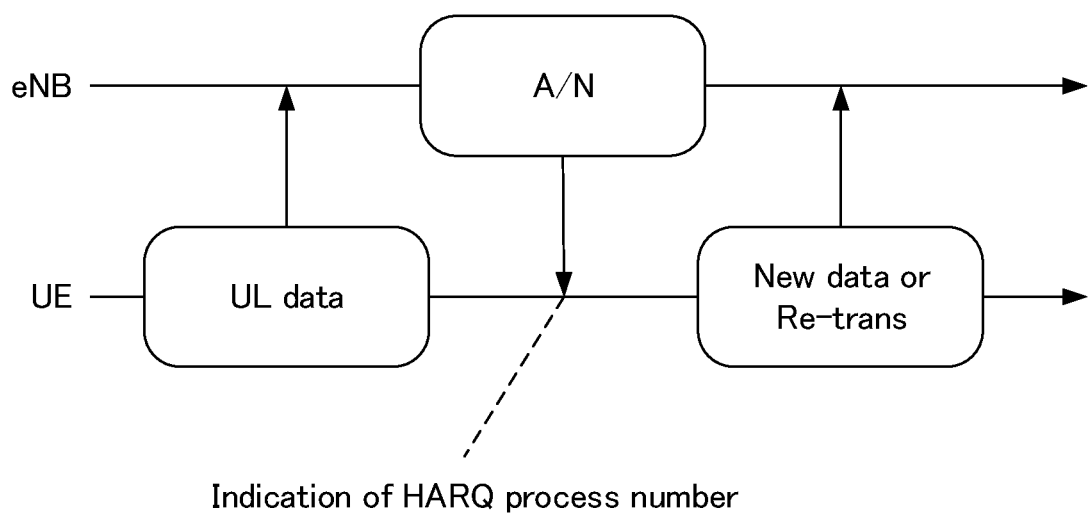
FIG. 7B is a diagram to explain a process in which feedback timing is not configured in the third embodiment.

In the third embodiment, the control section 301 configures the HARQ-ACK feedback transmission timing in response to UL data by higher layer signaling (see FIG. 7A). Examples of timing to be configured are one TTI later, two TTIs later, four TTIs later or eight TTIs later. When asynchronous HARQ is used, feedback timing is not configured.

In the fourth embodiment, the control section 301 configures the transmission timing according to the capability information of the user terminal reported by UE capability signaling.

The control section 301 can be constituted by a controller, a control circuit or a control device that can be described based on common understanding of the technical field to which the present invention pertains.

The transmission signal generation section 302 generates DL signals (downlink control signals, downlink data signals, downlink reference signals and so on) based on commands from the control section 301, and outputs these signals to the mapping section 303. To be more specific, the transmission signal generation section 302 generates downlink data signals (PDSCH) including the above-mentioned reporting information (control information) to be sent in higher layer signaling, user data and so on, and outputs the generated downlink data signals (PDSCH) to the mapping section 303. Further, the transmission signal generation section 302 generates a downlink control signal (PDCCH/EPDCCH), including above-mentioned DCI, and outputs this to the mapping section 303. Further, the transmission signal generation section 302 generates downlink reference signals such as CRS and CSI-RS, and outputs them to the mapping section 303.

For the transmission signal generation section 302, a signal generator, a signal generating circuit or a signal generating device that can be described based on common understanding of the technical field to which the present invention pertains can be used.

The mapping section 303 maps the downlink signals generated in the transmission signal generation section 302 to predetermined radio resources based on commands from the control section 301, and outputs these to the transmitting/receiving sections 103. For the mapping section 303, a mapper, a mapping circuit or a mapping device that can be described based on common understanding of the technical field to which the present invention pertains can be used.

The received signal processing section 304 performs the receiving process (for example, demapping, demodulation, decoding and so on) of uplink signals that are transmitted from the user terminals 20. The processing results are output to the control section 301.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 16:
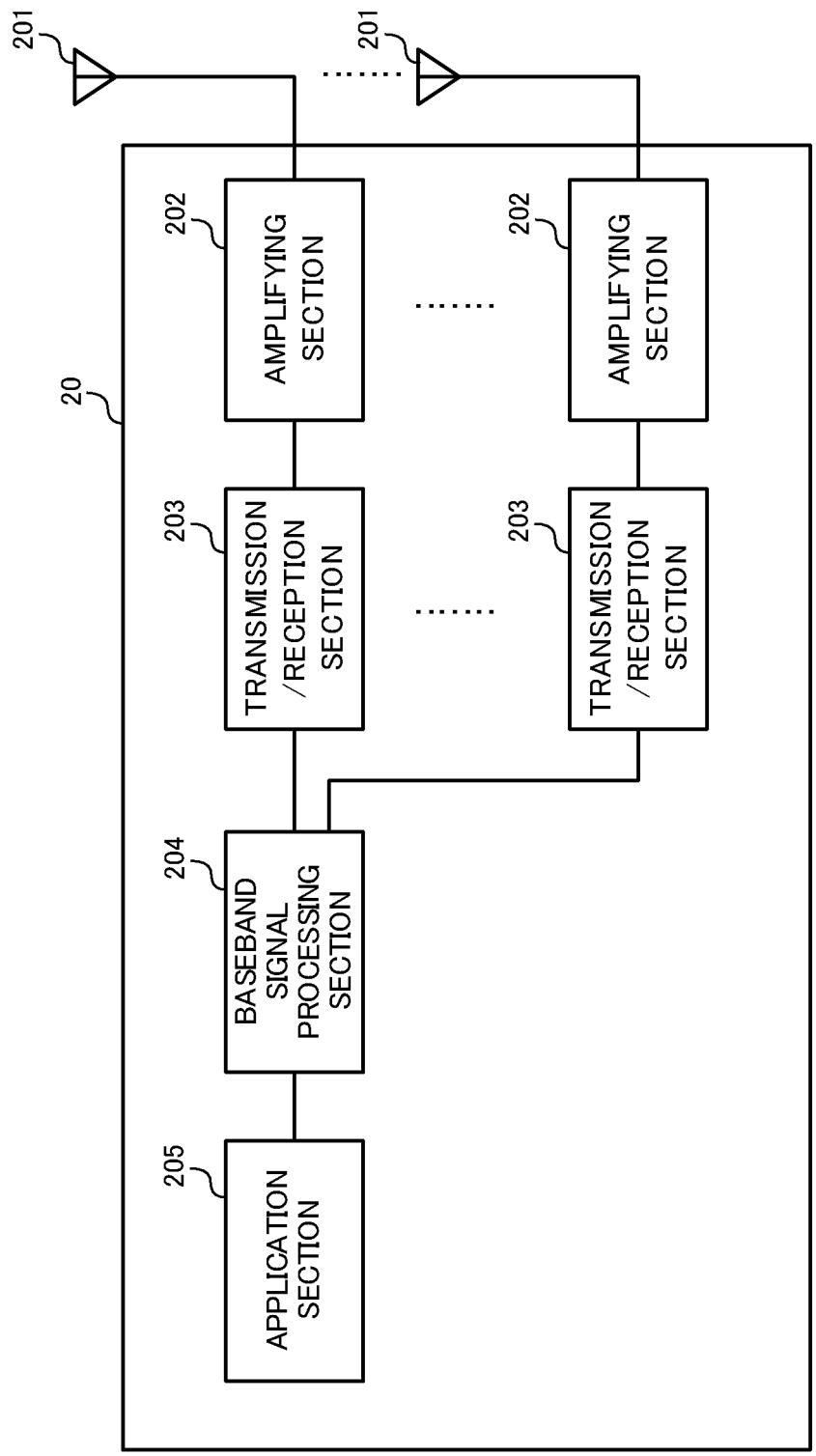
FIG. 16 is a diagram to illustrate an example of an overall structure of a user terminal according to present embodiment.

FIG. 16 is a diagram to illustrate an example of an overall structure of a user terminal according to one embodiment of the present invention. The user terminal 20 includes a plurality of transmitting/receiving antennas 201 for MIMO (Multi-Input Multi-Output) transmission, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the downlink signals amplified in the amplifying sections 202. The received signal is subjected to frequency conversion and converted into the baseband signal in the transmitting/receiving sections 203, and output to the baseband signal processing section 204.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency bandwidth in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

For the transmitting/receiving sections 203, transmitters/receivers, transmitting/receiving circuits or transmitting/receiving devices that can be described based on common understanding of the technical field to which the present invention pertains can be used. Furthermore, transmitting/receiving sections 203 may be structured as one transmitting/receiving section, or may be formed with a transmitting section and a receiving section.

Figure 17:
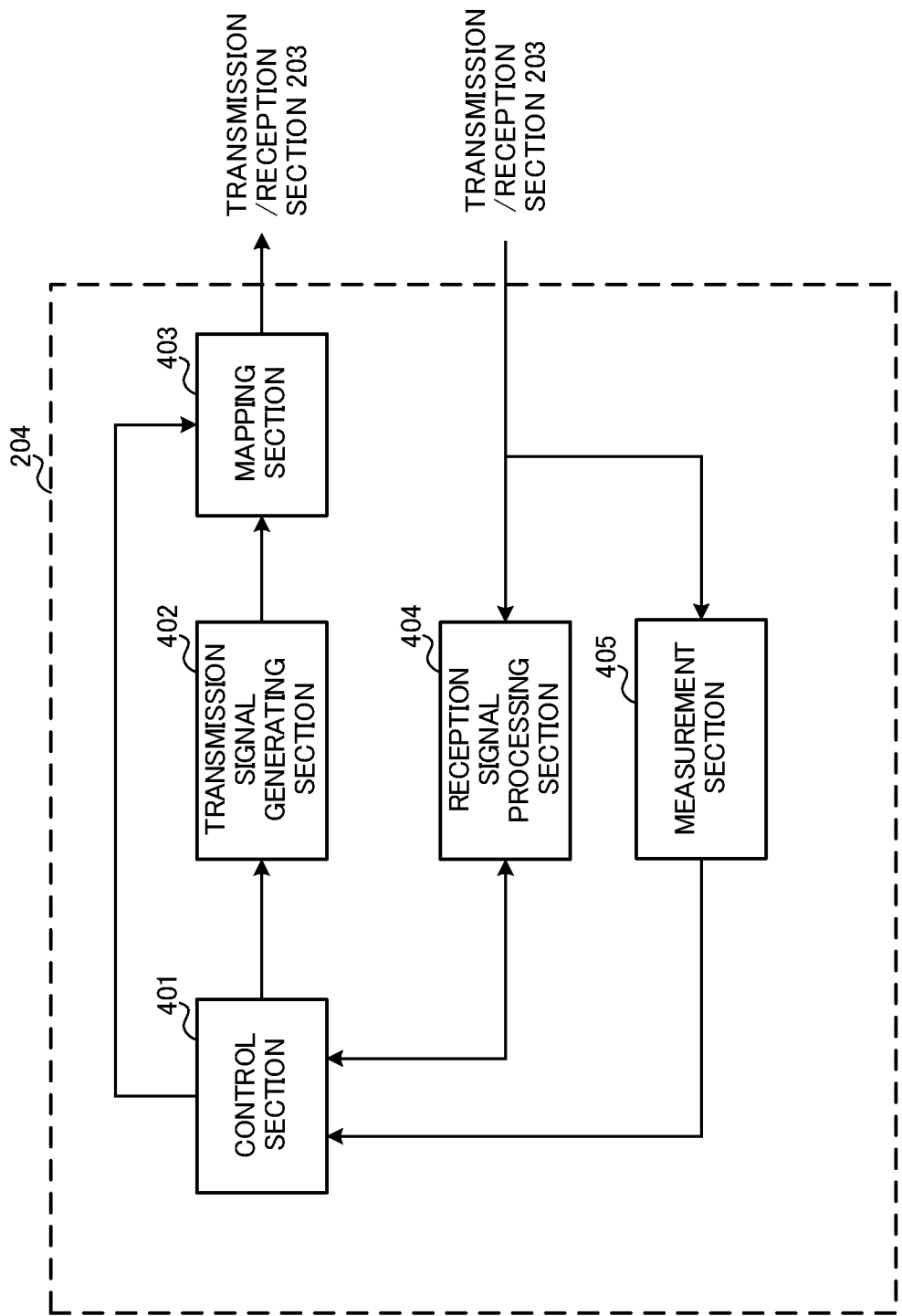
FIG. 17 is a diagram to illustrate an example of a functional structure of a user terminal according to present embodiment.

FIG. 17 is a diagram to illustrate an example of a functional structure of a user terminal according to the present embodiment. Note that, although FIG. 17 primarily illustrates functional blocks that pertain to characteristic parts of the present embodiment, the user terminal 20 has other functional blocks that are necessary for radio communication as well. As illustrated in FIG. 17, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of signals in the transmission signal generation section 402, the mapping of signals in the mapping section 403, the signal receiving process in the received signal processing section 404, and so on.

Further, the control section 401 controls the transmission time intervals (TTI) used to receive downlink (DL) signals and/or to transmit of uplink (UL) signals. The control section 301 configures one-ms normal TTIs and/or shortened TTIs that are shorter than normal TTIs. Example structures and configurations of shortened TTIs have been explained with reference to FIGS. 2A, 2B, 3A, 3B, and 3C. The control section 401 may configure (detect) shortened TTIs based on (1) implicit reporting, or based on explicit reporting using at least one of (2) RRC signaling, (3) MAC signaling and (4) PHY signaling, from the radio base station 10.

In the first embodiment, the control section 401 performs control so that HARQ-ACK in response to DL data is transmitted four TTIs later, and UL data in response to UL grant is transmitted four TTIs later. Alternatively, control may be performed so that HARQ-ACK in response to DL data is transmitted (4+k) TTIs later, and UL data in response to UL grant is transmitted (4+1) TTIs later.

In the second embodiment, the control section 401 performs control so that HARQ-ACK in response to DL data is transmitted x ms later (where x<4) (or in the first UL-TTI after x ms), and UL data in response to UL grant is transmitted x ms later (where x<4) (or in the first UL-TTI after x ms). Alternatively, control may be performed so that HARQ-ACK in response to DL data is transmitted a x TTIs later, and UL data in response to UL grant is transmitted a x TTIs later.

In the third embodiment, when the PHICH is received at a configured timing, the control section 401 performs control so that non-adaptive retransmission is performed according to the PHICH. Also, if a UL grant is detected at a configured timing, adaptive retransmission may be performed according to the UL grant. Also, if a NACK is returned simply, adaptive retransmission or non-adaptive retransmission may be performed.

Also, when asynchronous HARQ is applied without using the PHICH, it is not necessary to try receiving the PHICH—that is, the same operation as when an ACK is received in the PHICH may be performed. The control section 401 performs asynchronous retransmission based on the HPN indicator included in a UL grant.

In accordance with embodiment 4.1, if HARQ-ACK feedback in response to DL data is sent via PUCCH transmission, the control section 401 performs control so that different processing latencies are reported as UE capability information according to specific condition. In addition, in embodiment 4.2, when UL data is transmitted in response to UL grant, control is performed so that different processing latencies are reported as UE capability information according to specific conditions.

For the control section 401, a controller, a control circuit or a control device that can be described based on common understanding of the technical field to which the present invention pertains can be used.

The transmission signal generation section 302 generates DL signals (downlink control signals, downlink data signals, downlink reference signals and so on) based on commands from the control section 301, and outputs these signals to the mapping section 303. For example, the transmission signal generation section 402 generates uplink control signals (PUCCH) including UCI (at least one of HARQ-ACK, CQI, and SR).

For the transmission signal generation section 402, a signal generator, a signal generating circuit or a signal generating device that can be described based on common understanding of the technical field to which the present invention pertains can be used.

The mapping section 403 maps the UL signals (uplink control signals and/or uplink data signals) generated in the transmission signal generation section 402 to radio resources based on commands from the control section 401, and output the result to the transmitting/receiving sections 203. For the mapping section 403, mapper, a mapping circuit or a mapping device that can be described based on common understanding of the technical field to which the present invention pertains can be used.

The received signal processing section 404 performs the receiving process (for example, demapping, demodulation, decoding, etc.) of downlink signals (including downlink control signals and downlink data signals). The received signal processing section 404 outputs the information received from the radio base station 10, to the control section 401. The received signal processing section 404 outputs, for example, broadcast information, system information, control information by higher layer signaling such as RRC signaling, DCI, and the like, to the control section 401.

The received signal processing section 404 can be constituted by a signal processor, a signal processing circuit or a signal processing device that can be described based on common understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Measurement of the channel state may be performed for each CC.

The measurement section 405 can be constituted by a signal processor, a signal processing circuit or a signal processing device, and a measurer, a measurement circuit or a measurement device that can be described based on common understanding of the technical field to which the present invention pertains.

(Hardware Structure)

Note that the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be implemented with one physically-integrated device, or may be implemented by connecting two physically-separate devices via radio or wire and by using these multiple devices.

Figure 18:
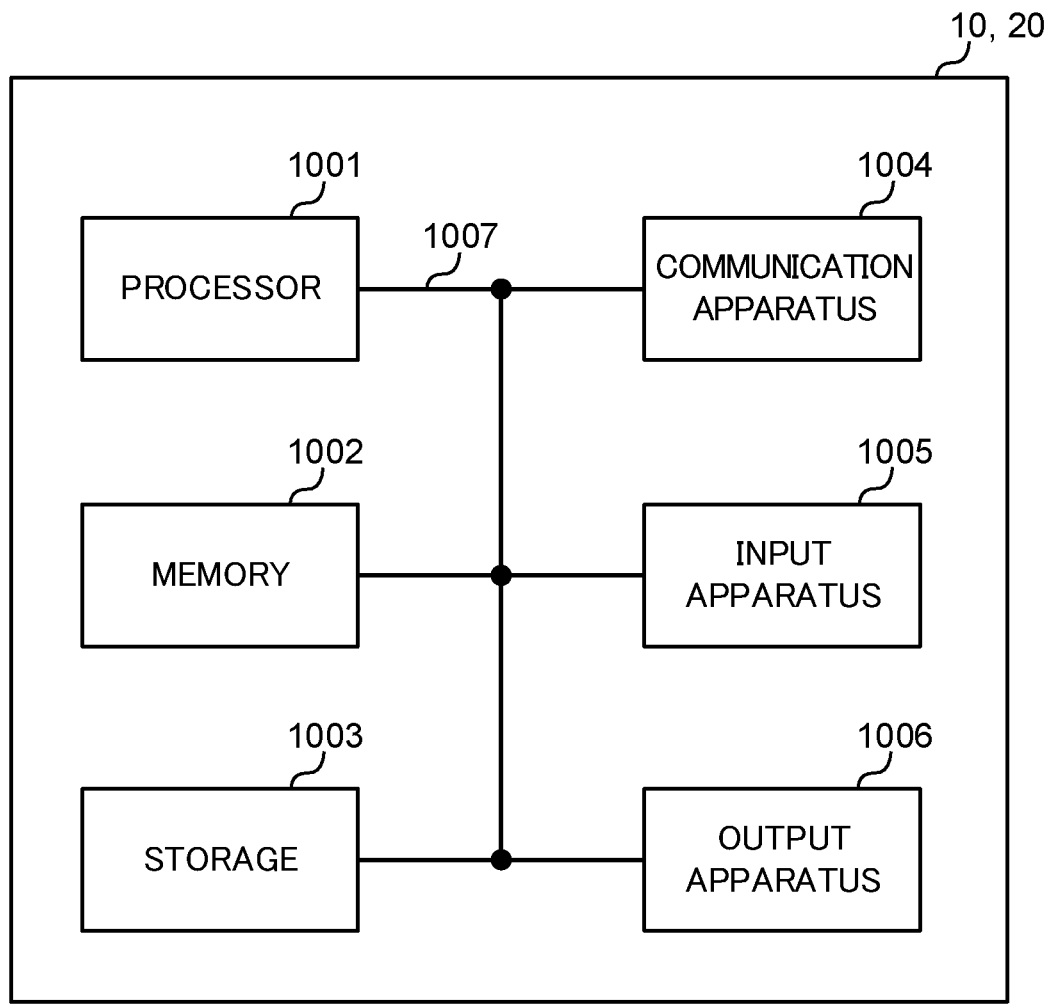
FIG. 18 is a diagram to illustrate an example hardware structure of a radio base station and a user terminal according to the present embodiment.

That is, the radio base stations, user terminals and so on according to embodiments of the present invention may function as a computer that executes the processes of the radio communication method of the present invention. FIG. 18 is a diagram to illustrate an example hardware structure of a radio base station and a user terminal according to an embodiment of the present invention. Physically, a radio base station 10 and a user terminal 20, which have been described above, may be formed as a computer apparatus that includes a processor 1001, a memory 1002, a storage 1003, a communication apparatus 1004, an input apparatus 1005, an output apparatus 1006 and a bus 1007.

Note that, in the following description, the word "apparatus" may be replaced by "circuit," "device," "unit" and so on. Note that the hardware structure of the radio base station 10 and the user terminal 20 may be designed to include one or more of each apparatus illustrated in the drawings, or may be designed not to include part of the apparatuses.

Each function of the radio base station 10 and the user terminal 20 is implemented by reading predetermined software (programs) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU) including an interface with a peripheral device, a control device, a computing device, a register, and the like. For example, the above-described baseband signal process section 104 (204), call processing section 105 and so on may be implemented by the central processing apparatus 1001.

Further, the processor 1001 reads a program (program code), a software module or data from the storage 1003 and/or the communication device 1004 to the memory 1002, and executes various processes according to these. As for the programs, programs to allow the computer to execute at least part of the operations of the above-described embodiments may be used. For example, the control section 401 of the user terminals 20 may be stored in the memory 1002 and implemented by a control program that operates on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), a RAM (Random Access Memory) and so on. The memory 1002 may be referred to as a "register," a "cache," a "main memory" (primary storage apparatus) or the like. The memory 1002 can store executable programs (program codes), software modules, and the like for implementing the radio communication methods according to embodiments of the present invention.

The storage 1003 is a computer readable recording medium, and is configured with at least one of an optical disk such as a CD-ROM (Compact Disc ROM), a hard disk drive, a flexible disk, a magneto-optical disk, a flash memory and so on. The storage 1003 may be referred to as a "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, etc.). The output apparatus 1006 is an output device for allowing sending output to the outside (for example, a display, a speaker, etc.). Note that the input apparatus 1005 and the output apparatus 1006 may be provided in an integrated structure (for example, a touch panel).

Further, the respective devices such as the processor 1001 and the memory 1002 are connected by a bus 1007 for communicating information. The bus 1007 may be formed with a single bus, or may be formed with buses that vary between the apparatuses.

Also, the radio base station 10 and the user terminal 20 may be structured to include hardware such as a microprocessor, an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these hardware.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "cells," "frequency carriers," "carrier frequencies" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. Further, a slot may be comprised of one or more symbols (OFDM symbols, SC-FDMA symbols, etc.) in the time domain.

A radio frame, a subframe, a slot and a symbol all represent the time unit in signal communication. Radio frames, subframes, slots and symbols may be called by other names. For example, one subframe may be referred to as a "transmission time interval" (TTI), or a plurality of consecutive subframes may be referred to as a "TTI," and one slot may be referred to as a "TTI." That is, a subframe and a TTI may be a subframe (one ms) in existing LTE, may be a shorter period than one ms (for example, 1 to 13 symbols), or may be a longer period of time than one ms.

Here, a TTI refers to the minimum time unit of scheduling in wireless communication, for example. For example, in LTE systems, the radio base station schedules the allocation radio resources (such as the frequency bandwidth and transmission power that can be used by each user terminal) to each user terminal in TTI units. The definition of TTIs is not limited to this.

A TTI having a time duration of one ms may be referred to as a "normal TTI" (TTI in LTE Rel. 8 to 12), a "long TTI," a "normal subframe," a "long subframe," etc. A TTI that is shorter than a normal TTI may be referred to as a "shortened TTI," a "short TTI," a "shortened subframe," a "short subframe," or the like.

A resource block (RB) is a resource allocation unit in the time domain and the frequency domain, and may include one or a plurality of consecutive subcarriers in the frequency domain. Also, an RB may include one or more symbols in the time domain and may be one slot, one subframe or one TTI in length. One TTI and one subframe each may be comprised of one or more resource blocks. Note that an RB may be referred to as a "physical resource block" (PRB: Physical RB), a "PRB pair," an "RB pair," or the like.

Further, a resource block may be comprised of one or more resource elements (REs). For example, one RE may be a radio resource field of one subcarrier and one symbol.

Note that the structures of radio frames, subframes, slots, symbols and the like described above are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) length can be variously changed.

Also, the information and parameters described in this description may be represented in absolute values or in relative values with respect to a predetermined value, or may be represented in other information formats. For example, radio resources may be specified by predetermined indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

Also, software and commands may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation and microwaves), these wired technologies and/or wireless technologies are also included in the definition of communication media.

Further, the radio base station in this specification may be read by a user terminal. For example, each aspect/embodiment of the present invention may be applied to a configuration in which communication between a radio base station and a user terminal is replaced with communication between a plurality of user terminals (D2D: Device-to-Device). In this case, the user terminal 20 may have the functions of the radio base station 10 described above. In addition, wording such as "uplink" and "downlink" may be interpreted as "side." For example, an uplink channel may be interpreted as a side channel.

Likewise, a user terminal in this specification may be interpreted as a radio base station. In this case, the radio base station 10 may have the functions of the user terminal 20 described above.

The examples/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, broadcast information (the MIB (Master Information Blocks) and SIBs (System Information Blocks) and so on) and MAC (Medium Access Control) signaling, other signals or combinations of these The examples/embodiments illustrated in this description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, to it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The invention claimed is:

1. A terminal comprising:
   a receiver that receives a physical downlink shared channel (PDSCH);
   a transmitter that transmits retransmission control information (Hybrid Automatic Repeat reQuest-Acknowledgement: HARQ-ACK) for the PDSCH based on second processing capability; and
   a processor that, when a number of resource blocks for the PDSCH exceeds a number, controls to provide the HARQ-ACK based on first processing capability that is different from the second processing capability.

2. The terminal according to claim 1, wherein the processor provides the HARQ-ACK with the first processing capability based on information related to the second processing capability.

3. A radio communication method in a terminal, comprising:
- receiving a physical downlink shared channel (PDSCH);
- transmitting retransmission control information (Hybrid Automatic Repeat reQuest-Acknowledgement: HARQ-ACK) for the PDSCH based on second processing capability; and
- when a number of resource blocks for the PDSCH exceeds a number, controlling to provide the HARQ-ACK based on first processing capability that is different from the second processing capability.

* * * * *